(12) United States Patent
Numata

(10) Patent No.: US 11,637,945 B2
(45) Date of Patent: Apr. 25, 2023

(54) IMAGE PROCESSING APPARATUS, METHOD, AND PRODUCT FOR IDENTIFYING AND EXTRACTING AN ENTIRE CODE FROM A PLURAILITY OF READ PORTIONS OF A SHEET

(71) Applicant: CANON KABUSHIKI KAISHA, Tokyo (JP)

(72) Inventor: Chiaki Numata, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/734,386

(22) Filed: May 2, 2022

(65) Prior Publication Data
US 2022/0360683 A1    Nov. 10, 2022

(30) Foreign Application Priority Data

May 6, 2021   (JP) .............................. JP2021-078550

(51) Int. Cl.
| | | |
|---|---|---|
| H04N 1/32 | (2006.01) | |
| H04N 1/387 | (2006.01) | |
| H04N 1/00 | (2006.01) | |
| H04N 1/191 | (2006.01) | |
| H04N 1/193 | (2006.01) | |

(52) U.S. Cl.
CPC ..... *H04N 1/32133* (2013.01); *H04N 1/00005* (2013.01); *H04N 1/00074* (2013.01); *H04N 1/00082* (2013.01); *H04N 1/1917* (2013.01); *H04N 1/1933* (2013.01); *H04N 1/3876* (2013.01); *H04N 2201/3269* (2013.01)

(58) Field of Classification Search
CPC .......... H04N 1/00005; H04N 1/00074; H04N 1/00082; H04N 1/1917; H04N 1/1933; H04N 1/32133; H04N 1/3876; H04N 2201/3269
See application file for complete search history.

(56) References Cited

U.S. PATENT DOCUMENTS

| | | | | |
|---|---|---|---|---|
| 8,675,245 B2* | 3/2014 | Itoh | ..................... | H04N 1/00811 358/1.18 |
| 9,654,661 B1* | 5/2017 | Okada | ................ | H04N 1/32144 |
| 2004/0016814 A1* | 1/2004 | Muramatsu | ............ | H04N 7/142 235/462.41 |

FOREIGN PATENT DOCUMENTS

JP           2011010064 A        1/2011

\* cited by examiner

*Primary Examiner* — Scott A Rogers
(74) *Attorney, Agent, or Firm* — Rossi, Kimms & McDowell LLP

(57) ABSTRACT

An image processing apparatus for inspection of a sheet on which a code image obtained by encoding predetermined information is printed includes: a first acquisition unit which acquires positional information indicating a position and a size of the code image in the sheet; a second acquisition unit which acquires a plurality of read images obtained by a plurality of reading units reading different portions of the sheet, respectively, wherein the read images become an image indicating the entire sheet by being combined; a determination unit which determines whether any one of the read images includes the entire code image based on the positional information; and an extraction unit which extracts the predetermined information by, in a case where there is a read image including the entire code image, reading the code image in that read image.

15 Claims, 18 Drawing Sheets

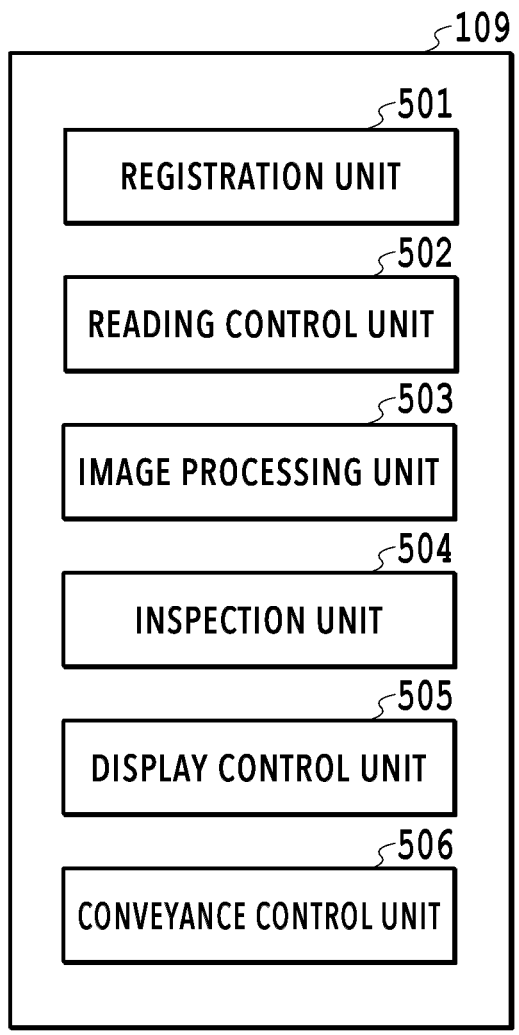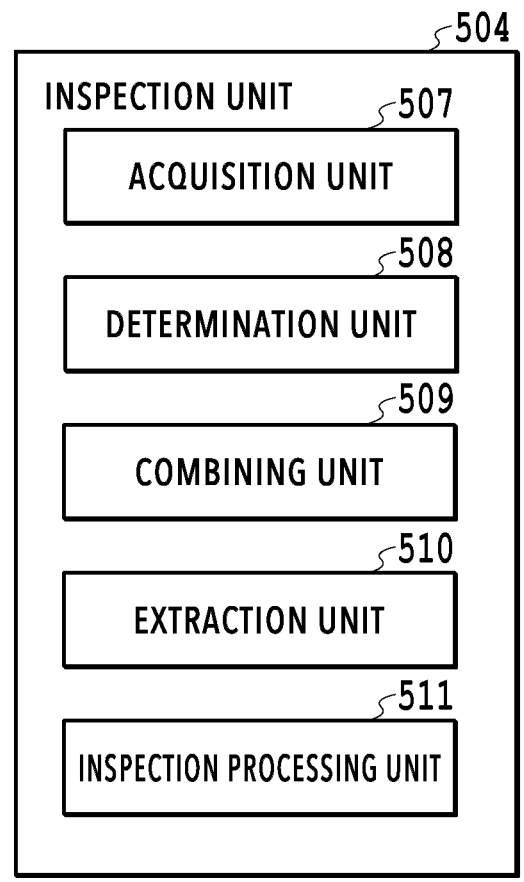
FIG.5A
FIG.5B

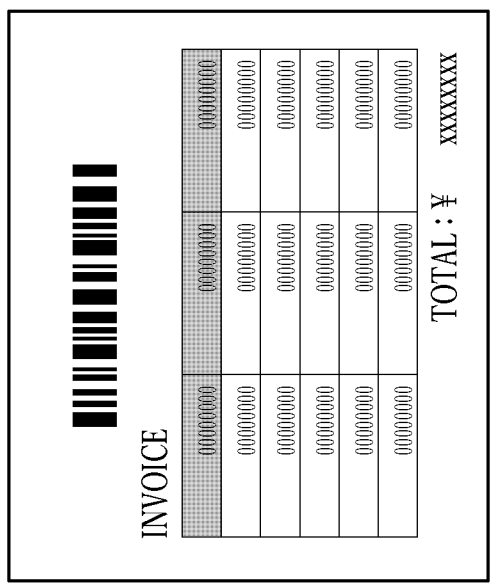
FIG.7A
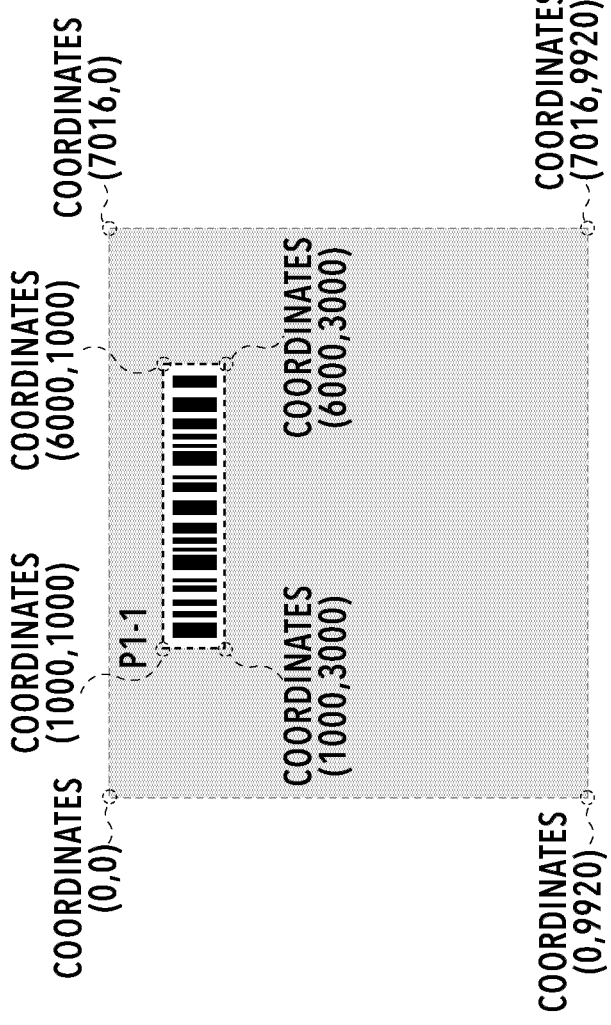
FIG.7B
ID AREA
FIG.7C
POSITIONAL INFORMATION ON ID AREA
| | | | | | |
|---|---|---|---|---|---|
| P1-1 | X | 1000 | 6000 | 6000 | 1000 |
| | Y | 1000 | 1000 | 3000 | 3000 |
FIG.7D

IMAGE PROCESSING APPARATUS, METHOD, AND PRODUCT FOR IDENTIFYING AND EXTRACTING AN ENTIRE CODE FROM A PLURAILITY OF READ PORTIONS OF A SHEET

BACKGROUND OF THE DISCLOSURE

Field of the Disclosure

The present disclosure relates to a technique to inspect a sheet which has undergone printing processing.

Description of the Related Art

There is a method of extracting predetermined information embedded in a code image such as a barcode by reading the code image from a read image obtained by reading a sheet on which the code image is printed. By acquiring a content printed on the sheet based on the predetermined information, the sheet which has undergone printing processing can be inspected according to the content printed on the sheet.

As the method of acquiring a read image for extracting predetermined information, there is a method of acquiring a read image of a printed sheet having the maximum sheet width conveyable by a printing apparatus which prints an image by combining a plurality of read sensors each having a read range less than the maximum width of a sheet.

Japanese Patent Laid-Open No. 2011-010064 discloses a method of reading a document having a width greater than the width of a read range of a read line sensor by combining images obtained by two read line sensors reading the document.

In the case of generating a combined image by combining two images obtained by two read sensors reading a sheet like the method disclosed in Japanese Patent Laid-Open No. 2011-010064, a pixel shift may occur at the boundary of the combined image. If a pixel shift occurs in an area with a code image such as a barcode, there is a possibility that the barcode cannot be correctly read from the combined image. If the barcode cannot be read correctly, the extraction of predetermined information embedded in the barcode may end in failure.

SUMMARY OF THE DISCLOSURE

An image processing apparatus according to the present disclosure is an image processing apparatus for inspection of a sheet on which a code image obtained by encoding predetermined information is printed, the image processing apparatus comprising: a first acquisition unit configured to acquire positional information indicating a position and a size of the code image in the sheet; a second acquisition unit configured to acquire a plurality of read images obtained by a plurality of reading units reading different portions of the sheet, respectively, wherein the read images become an image indicating the entire sheet by being combined; a determination unit configured to determine whether any one of the read images includes the entire code image based on the positional information; and an extraction unit configured to extract the predetermined information by, in a case where there is a read image including the entire code image, reading the code image in that read image.

Further features of the present disclosure will become apparent from the following description of exemplary embodiments with reference to the attached drawings.

BRIEF DESCRIPTION OF THE DRAWINGS

FIGS. 5A and 5B are diagrams showing a functional configuration of an inspection apparatus;
FIGS. 7A to 7D are diagrams illustrating an ID area.

DESCRIPTION OF THE EMBODIMENTS

Embodiments of the technique of the present disclosure will be hereinafter described with reference to the drawings. In the following description, an external controller may also be referred to as an image processing controller, digital front end, print server, and DFE. An image forming apparatus may also be referred to as a multifunction apparatus, multifunction peripheral, and MFP.

First Embodiment

Figure 1:
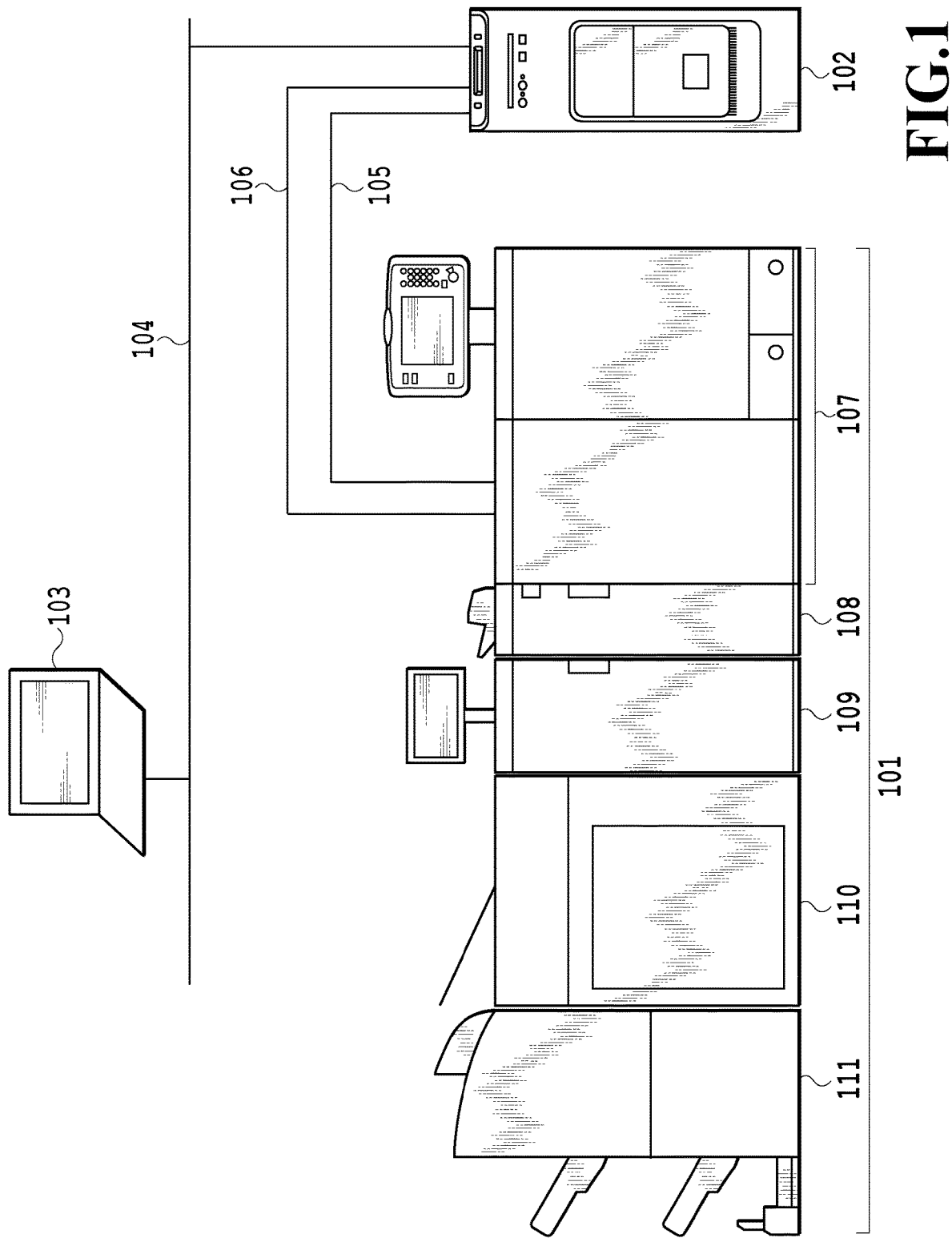
FIG. 1 is a diagram showing a configuration of an entire print system.

[System Configuration]
FIG. 1 is an overall view illustrating a print system configuration according to the present embodiment. The print system comprises an image forming apparatus 101 and an external controller 102. The image forming apparatus 101 and the external controller 102 are connected via an internal LAN 105 and a video cable 106 so as to communicate with each other. The external controller 102 is connected to a personal computer (PC) 103, which is a client terminal, via an external LAN 104 so as to communicate with the PC 103. The PC 103 issues a print instruction to the external controller 102.

In the PC 103, a printer driver having the function of converting print data into a print description language processable by the external controller 102 is installed. A user can instruct printing via the printer driver from various applications. The printer driver transmits print data to the external controller 102 based on the print instruction from a user. Upon receipt of the print instruction from the PC 103, the external controller 102 performs data analysis and rasterizing processing for the print data, input the print data to the image forming apparatus 101, and instructs printing.

Next, the image forming apparatus 101 will be described. The image forming apparatus 101 comprises a printing apparatus 107, an inserter 108, an inspection apparatus 109, a large capacity stacker 110, and a finisher 111. The image forming apparatus 101 according to the present embodiment includes a plurality of apparatus with different functions so as to perform complex printing processing such as bookbinding.

The printing apparatus 107 is an apparatus which forms an image with toner on a sheet conveyed from a sheet feeding unit 230 (see FIG. 2) at the bottom of the printing apparatus 107.

The inserter 108 is an apparatus for inserting a sheet and can insert a sheet at an arbitrary position in a group of sheets printed by the printing apparatus 107 and conveyed.

The inspection apparatus 109 is an apparatus for reading a sheet which has undergone printing processing in the printing apparatus 107 and inspecting, for example, whether the printed image is normal. The inspection in the inspection apparatus 109 will be described later in detail.

The large capacity stacker 110 is a stacker capable of stacking a large number of sheets. The finisher 111 is an apparatus which applies finishing processing to a conveyed sheet. The finisher 111 is capable of finishing processing such as stapling, punching, and saddle stitching. A sheet which has undergone the finishing processing is discharged to a sheet discharging tray.

Although the external controller 102 is connected to the image forming apparatus 101 in the print system illustrated in FIG. 1, the print system is not limited to the configuration of FIG. 1. For example, the image forming apparatus 101 may be connected to the external LAN 104 such that print data processable by the image forming apparatus 101 is directly transmitted from the client PC 103. In this case, the image forming apparatus 101 performs data analysis, rasterizing processing, and the like and then executes print processing.

[Configuration of Each Apparatus of Print System]

Figure 2:
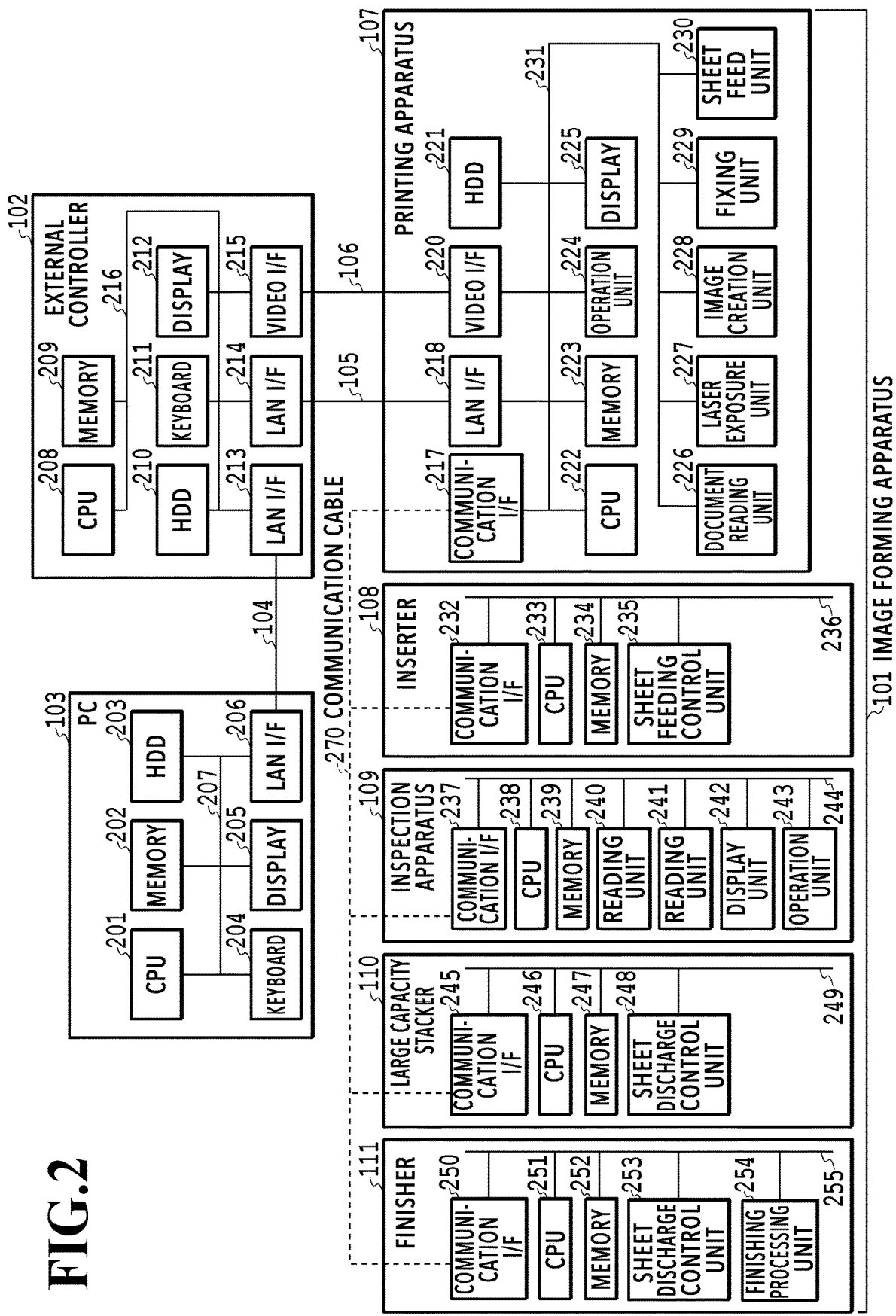
FIG. 2 is a block diagram showing a system configuration of the print system.

FIG. 2 is a block diagram illustrating a configuration of each unit included in each of the image forming apparatus 101, the external controller 102, and the client PC 103.

First, the configuration of the printing apparatus 107 of the image forming apparatus 101 will be described. The printing apparatus 107 comprises a communication I/F 217, a LAN I/F 218, a video I/F 220, an HDD 221, a CPU 222, a memory 223, an operation unit 224, and a display 225. The printing apparatus 107 also comprises a document reading unit 226, a laser exposure unit 227, an image creating unit 228, a fixing unit 229, and a sheet feeding unit 230. The constituent elements are connected to each other via a system bus 231.

The communication I/F 217 is connected to the inserter 108, the inspection apparatus 109, the large capacity stacker 110, and the finisher 111 via a communication cable 270 to perform communication for control of each apparatus. The LAN I/F 218 is connected to the external controller 102 via the internal LAN 105 to communicate print data and the like. The video I/F 220 is connected to the external controller 102 via the video cable 106 to communicate image data and the like.

The HDD 221 is a storage apparatus storing a program and data. The CPU 222 comprehensively controls image processing and printing based on the program and the like stored in the HDD 221. The memory 223 stores a program, image data, and the like necessary for the CPU 222 to execute various kinds of processing and serves as a work area. The operation unit 224 accepts input of various settings and instructions from a user. The display 225 displays setting information on image processing, a printing status, information for settings, a processing status of a print job, and the like.

The document reading unit 226 performs processing of reading a document in the case of using a copy or scan function. A document is read by capturing an image with a CCD camera while illuminating a placed sheet with an exposure lamp.

The laser exposure unit 227 performs primary charging and laser exposure for irradiating a photoconductor drum with a laser beam in order to transfer a toner image. The laser exposure unit 227 first performs primary charging such that the surface of the photoconductor drum has a uniform negative potential. Next, a laser driver irradiates the photoconductor drum with a laser beam while adjusting a reflection angle using a polygon mirror. This neutralizes the negative charge in the irradiated portion and forms an electrostatic latent image.

The image creating unit 228 is a unit for transferring toner to a sheet. The image creating unit 228 has a developing unit, a transfer unit, a toner refilling unit, and the like and transfers toner from the photoconductor drum to a sheet. The developing unit causes the negatively-charged toner on a developing cylinder to adhere to the electrostatic latent image on the surface of the photoconductor drum and thereby forms a visible image. The developing unit performs primary transfer by applying a positive potential to a primary transfer roller and transferring the toner from the surface of the photoconductor drum to a transfer belt and secondary transfer by applying a positive potential to a secondary transfer roller and transferring the toner from the transfer belt to a sheet.

The fixing unit 229 is a unit for fusing and fixing toner on a sheet using heat and pressure and comprises a heater having a halogen heater or the like as a heat source, a fixing belt, a pressure belt, and the like. The sheet feeding unit 230 is a unit which feeds a sheet and controls sheet feeding and conveying operation using rollers and various sensors.

The principle of print operation of the printing apparatus 107 performed by each of the units described above is as follows. The laser exposure unit 227 reflects a beam such as a laser beam modulated according to image data on the rotary polygonal mirror such as a polygon mirror to obtain a scanning beam and irradiates the photoconductor drum with the scanning beam. An electrostatic latent image formed on the photoconductor drum by the laser beam is developed by toner. The image creating unit 228 transfers the toner image to a sheet attached to the transfer drum. The series of image forming processes is sequentially executed for yellow (Y), magenta (M), cyan (C), and black (K) toner, whereby a full-color image is formed on the sheet. The sheet with the full-color image formed thereon is conveyed from the transfer drum to the fixing unit 229. The fixing unit 229 fuses and fixes the toner on the sheet to which the toner image has been transferred by heat and pressure.

Next, the configuration of the inserter 108 will be described. The inserter 108 comprises a communication I/F 232, a CPU 233, a memory 234, and a sheet feeding control unit 235. The constituent elements are connected to each other via a system bus 236.

The communication I/F 232 is connected to the printing apparatus 107 via the communication cable 270 to perform communication necessary for control of the inserter 108. The CPU 233 performs various kinds of control necessary for sheet feeding according to a control program stored in the memory 234. The memory 234 is a storage apparatus storing the control program. The sheet feeding control unit 235 controls sheet feeding or conveyance of a sheet conveyed from an inserter tray 321 (see FIG. 3) or the printing apparatus 107 while controlling rollers and sensors constituting a conveyance path to be described later based on instructions from the CPU 233.

Next, the configuration of the inspection apparatus 109 will be described. The inspection apparatus 109 comprises a communication I/F 237, a CPU 238, a memory 239, a reading unit 240, a reading unit 241, a display unit 242, and an operation unit 243. The constituent elements are connected to each other via a system bus 244.

The communication I/F 237 is connected to the printing apparatus 107 via the communication cable 270 to perform communication necessary for control of the inspection apparatus 109. The CPU 238 performs various kinds of control necessary for inspection to be described later according to a control program stored in the memory 239. The memory 239 is a storage apparatus storing the control program. The display unit 242 displays a result of the inspection performed by the inspection apparatus 109, a setting screen, or the like. The operation unit 243 is operated by a user to accept an instruction to change the settings of the inspection apparatus 109, register a correct image to be described later, or the like.

The reading units 240 and 241 are apparatus capable of reading a conveyed printed sheet based on an instruction from the CPU 238. The reading unit 240 is an apparatus which reads the left part of a sheet and the reading unit 241 is an apparatus which reads the right part of a sheet. However, depending on the size of a sheet, the entire sheet can be read by only one of the reading units. Read images obtained by the respective reading units 240 and 241 reading a printed sheet are used for inspection to be described later.

Incidentally, the reading units 240 and 241 for reading a printed sheet may be included in an apparatus upstream of the inspection apparatus 109, such as the printing apparatus 107. In this case, the inspection apparatus 109 can perform inspection by acquiring read images obtained by reading by the reading units 240 and 241. The reading units 240 and 241 and the inspection processing will be described later in detail.

Next, the configuration of the large capacity stacker 110 will be described. The large capacity stacker 110 comprises a communication I/F 245, a CPU 246, a memory 247, and a sheet discharge control unit 248. The constituent elements are connected to each other via a system bus 249. The communication I/F 245 is connected to the printing apparatus 107 via the communication cable 270 to perform communication necessary for control of the large capacity stacker 110. The CPU 246 performs various kinds of control necessary for sheet discharging according to a control program stored in the memory 247. The memory 247 is a storage apparatus storing the control program. The sheet discharge control unit 248 performs control to convey a conveyed sheet to any one of a stack tray 341 (see FIG. 3), an escape tray 346 (see FIG. 3), and the subsequent finisher 111 based on instructions from the CPU 246.

Next, the configuration of the finisher 111 will be described. The finisher 111 comprises a communication I/F 250, a CPU 251, a memory 252, a sheet discharge control unit 253, and a finishing processing unit 254. The constituent elements are connected to each other via a system bus 255. The communication I/F 250 is connected to the printing apparatus 107 via the communication cable 270 to perform communication necessary for control of the finisher 111. The CPU 251 performs various kinds of control necessary for finishing and sheet discharging according to a control program stored in the memory 252. The memory 252 is a storage apparatus storing the control program. The sheet discharge control unit 253 controls sheet conveyance and discharging based on instructions from the CPU 251. The finishing processing unit 254 controls finishing processing to be described later based on instructions from the CPU 251.

Next, the configuration of the external controller 102 will be described. The external controller 102 comprises a CPU 208, a memory 209, an HDD 210, a keyboard 211, a display 212, a LAN I/F 213, a LAN I/F 214, and a video I/F 215. The constituent elements are connected to each other via a system bus 216. The CPU 208 comprehensively executes processing such as reception of print data from the PC 103, RIP processing, and transmission of print data to the image forming apparatus 101 based on a program or data stored in the HDD 210. The memory 209 stores a program and data necessary for the CPU 208 to execute various kinds of processing and serves as a work area. The HDD 210 stores a program and data necessary for operation such as printing processing. The keyboard 211 is an apparatus for a user to input an operation instruction to the external controller 102. The display 212 displays information on an execution application of the external controller 102 or the like as a still image or moving image based on a video signal. The LAN I/F 213 is connected to the PC 103 via the external LAN 104 to communicate a print instruction and the like. The LAN I/F 214 is connected to the image forming apparatus 101 via the internal LAN 105 to communicate a print instruction and the like. The video I/F 215 is connected to the image forming apparatus 101 via the video cable 106 to communicate print data and the like.

Next, the configuration of the PC 103 will be described. The PC 103 comprises a CPU 201, a memory 202, an HDD 203, a keyboard 204, a display 205, and a LAN I/F 206. The constituent elements are connected to each other via a system bus 207. The CPU 201 generates print data or instructs printing based on a document processing program or the like stored in the HDD 203. The CPU 201 also comprehensively controls each of the constituent elements connected to the system bus 207. The memory 202 stores a program and data necessary for the CPU 201 to execute various kinds of processing and serves as a work area. The HDD 203 stores a program and data necessary for operation such as printing processing. The keyboard 204 is an apparatus for accepting a user's input and instruction. The display 205 displays information on an execution application of the PC 103 or the like as a still image or moving image based on a video signal. The LAN I/F 206 is connected to the external LAN 104 to communicate a print instruction and the like.

Although the external controller 102 and the image forming apparatus 101 are connected via the internal LAN 105 and the video cable 106 in FIG. 2, any configuration may be adopted as long as data necessary for printing can be transmitted and received. For example, the external controller 102 and the image forming apparatus 101 may be connected only via the video cable 106.

Each of the above-described memories 202, 209, 223, 234, 239, 247, and 252 may be a storage apparatus for storing data and a program. For example, each of the memories may be replaced with a volatile RAM, nonvolatile ROM, built-in HDD, external HDD, or USB memory.

[Sheet Conveyance in Printing Operation]

Figure 3:
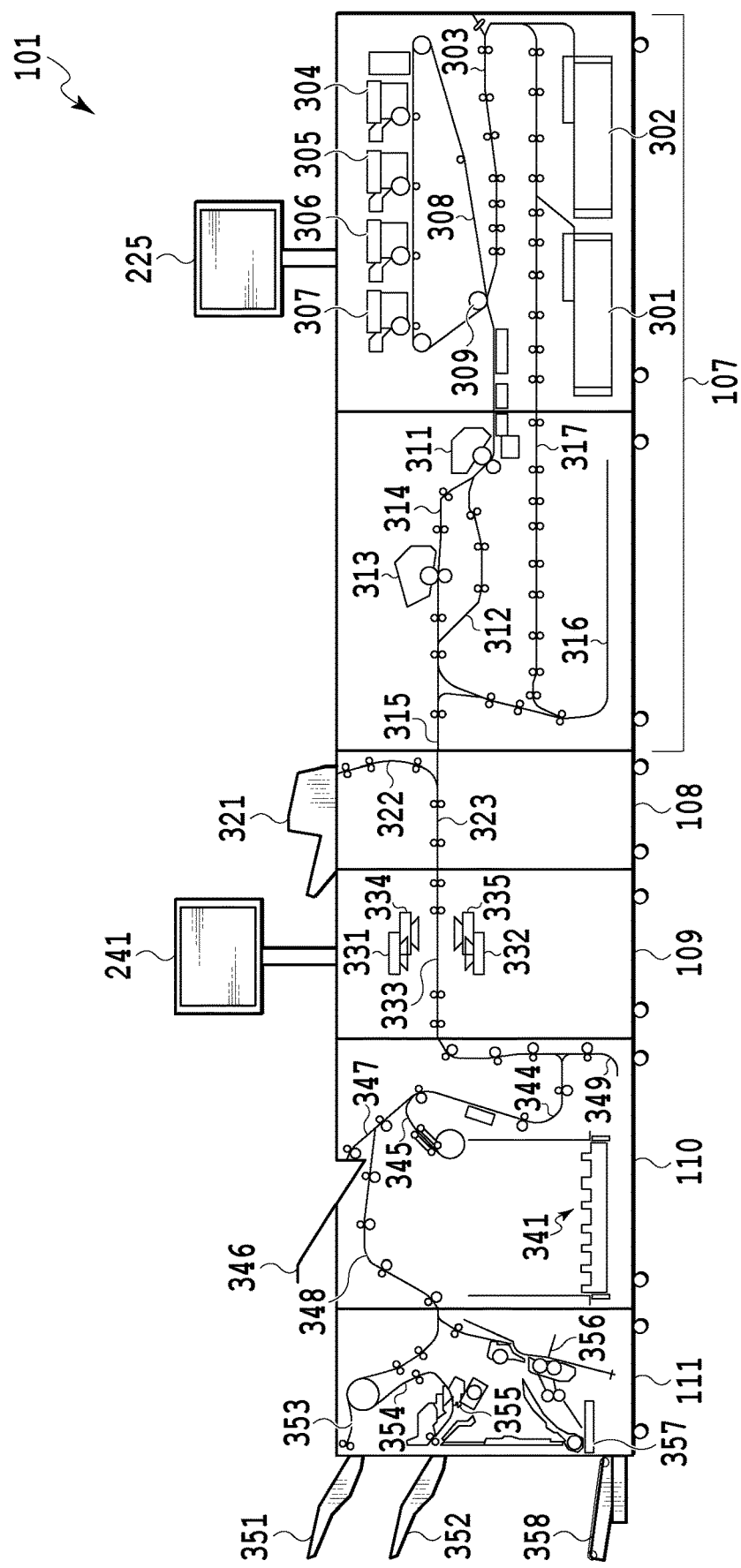
FIG. 3 is a schematic diagram showing a mechanical cross-sectional view of an image forming apparatus.

FIG. 3 is a mechanical cross-sectional view indicating a schematic configuration of the image forming apparatus 101. Sheet conveyance in printing operation will be described with reference to FIG. 3.

First, sheet conveyance in the printing apparatus 107 will be described. Sheet feeding decks 301 and 302 are configured to accommodate various sheets, separate only an uppermost sheet of the accommodated sheets, and convey the sheet to a sheet conveyance path 303. The sheet feeding decks 301 and 302 are included in the sheet feeding unit 230.

Sheet conveyance in the image creating unit 228 will be described. Developing stations 304 to 307 form toner images using color toner of Y, M, C, and K, respectively, in order to form a color image. The toner images formed here are primarily transferred to an intermediate transfer belt 308. The intermediate transfer belt 308 is turned clockwise in FIG. 3, whereby the toner images are transferred to the sheet conveyed from the sheet conveyance path 303 at a secondary transfer position 309.

Sheet conveyance in the fixing unit 229 will be described. A first fixing unit 311 is an apparatus for fixing the toner images to the sheet. The first fixing unit 311 comprises a pressure roller and a heat roller. The sheet passes between the rollers, whereby the toner is fused and pressed so as to fix the toner images to the sheet. After exiting the first fixing unit 311, the sheet is conveyed through a sheet conveyance path 312 to a sheet conveyance path 315 connecting with the inserter 108. In case of necessity of further fusing/pressing for fixing depending on the type of sheet, the sheet is conveyed to a second fixing unit 313 through an upper sheet conveyance path 314 after passing through the first fixing unit 311. In this case, the sheet is subjected to additional fusing/pressing in the second fixing unit 313 and then conveyed to the sheet conveyance path 315. In a case where an image forming mode is duplex printing, the sheet is conveyed to a sheet reversing path 316. After the sheet is reversed in the sheet reversing path 316, the sheet is conveyed to a duplex printing conveyance path 317 and image transfer is made to the back side of the sheet at the secondary transfer position 309.

The inserter 108 comprises the inserter tray 321 and is configured to insert a sheet fed to the inserter tray 321 into a conveyance path 323 through a sheet conveyance path 322. This configuration makes it possible to insert a sheet at an arbitrary position in a series of sheets conveyed from the printing apparatus 107 and convey the sheet to the subsequent apparatus. After passing through the inserter 108, the sheet is conveyed to the inspection apparatus 109.

In the inspection apparatus 109, cameras 331 and 334 are arranged to face cameras 332 and 335, respectively. The cameras 331 and 334 are reading units for reading the top side (front side) of a sheet and the cameras 332 and 335 are reading units for reading the bottom side (back side) of a sheet. The cameras 331 and 332 are apparatus corresponding to the reading unit 240 for reading the left part of a sheet. The cameras 334 and 335 are apparatus corresponding to the reading unit 241 for reading the right part of a sheet.

A printed sheet is read by the cameras 331 and 334 or the cameras 332 and 335 capturing the sheet at the timing of arrival of the sheet conveyed to a sheet conveyance path 333 at capturing ranges of the cameras. Whether an image included in the printed sheet is correctly printed can be determined by analyzing a read image obtained by reading the printed sheet. After passing through the inspection apparatus 109, the sheet is conveyed to the large capacity stacker 110.

The large capacity stacker 110 comprises the stack tray 341 which is a tray for stacking sheets. After passing through the inspection apparatus 109, the sheet is conveyed to a sheet conveyance path 344. The sheet passes through a sheet conveyance path 345 from the sheet conveyance path 344 and is stacked on the stack tray 341. The large capacity stacker 110 also comprises the escape tray 346 as a sheet discharging tray. The escape tray 346 is a sheet discharging tray used to discharge a printed sheet determined to be a defective sheet by the inspection apparatus 109. In the case of discharging a sheet to the escape tray 346, the sheet is conveyed from the sheet conveyance path 344 to the escape tray 346 through a sheet conveyance path 347.

In the case of conveying a sheet to the finisher 111, the sheet is conveyed through a sheet conveyance path 348. A reversing unit 349 functions in reversing a sheet. In the case of placing a sheet on the stack tray 341 such that the orientation of the input sheet is the same as the orientation of the sheet at the time of output, the reversing unit 349 can reverse the sheet. In the case of conveying a sheet to the escape tray 346 or the finisher 111, since the sheet is directly discharged without any flip at the time of placing, the sheet is not conveyed to the reversing unit 349.

The finisher 111 is an apparatus which performs finishing processing for a conveyed printed sheet in response to a user instruction. For example, the finisher 111 comprises an apparatus for implementing the function of finishing processing such as stapling (one staple/two staples), punching (two holes/three holes), or saddle stitching.

The finisher 111 also comprises two sheet discharging trays 351 and 352. A sheet is discharged to the sheet discharging tray 351 through a sheet conveyance path 353. The finishing processing cannot be performed in the sheet conveyance path 353. In a case where stapling or punching is performed as the finishing processing, a sheet is conveyed to a processing unit 355 through a sheet conveyance path 354. The processing unit 355 executes the finishing processing designated by a user. A printed sheet which has undergone the finishing processing is discharged to the sheet discharging tray 352. Each of the sheet discharging trays 351 and 352 can be moved up and down. For example, the sheet discharging tray 351 may be moved down such that a printed sheet which has undergone the finishing processing in the processing unit 355 is placed on the sheet discharging tray 351.

In a case where saddle stitching is designated as the finishing processing, a sheet is conveyed to a saddle stitching processing unit 356. The saddle stitching processing unit 356 can execute saddle stitching processing by performing stapling processing at the center of sheets and then folding the sheets in two. The printed sheets which have undergone the saddle stitching processing are discharged to a saddle stitching tray 358 through a sheet conveyance path 357. The saddle stitching tray 358 has a conveyer belt such that the saddle stitched booklet placed on the saddle stitching tray 358 is conveyed to the left.

[Summary of Inspection Processing]

The inspection apparatus 109 can determine, for example, whether a sheet on which an image is printed by the printing apparatus 107 (referred to as a printed sheet or printed matter) is a defective sheet. The defective sheet means a sheet on which an image is formed lacking a ruled line or having a printing failure or color shift differently from an image to be originally formed, or a sheet which is partially folded. For example, the defective sheet also includes a sheet partially lacking an image with an ID encoded and embedded therein (such as a barcode), which will be described later, and a sheet with images formed in an order different from an order in which they should be originally formed on the sheet. In a case where a printed sheet is determined to be a defective sheet, the defective sheet is discharged to a sheet discharging destination different from that of a printed sheet not determined to be a defective sheet (normal sheet) as described above. Accordingly, the defective sheet can be suppressed from being mixed into normal sheets and an operator can discard the defective sheet.

In the inspection processing by the inspection apparatus 109, a printed sheet with sufficient quality obtained by printing in advance is read and an image resulting from the reading is registered as a "correct image (also referred to as master image or reference image)." Whether a printed sheet is a defective sheet can be determined by comparing read images obtained by the reading units 240 and 241 of the inspection apparatus 109 reading the inspection target printed sheet with the correct image and detecting a difference therebetween. This inspection is referred to as image inspection.

The inspection apparatus 109 is also configured to extract an ID (identifier) by reading an image indicating the ID (also referred to as a code image) on the sheet. For example, the code image is a one- or two-dimensional barcode. The inspection apparatus 109 according to the present embodiment is configured to execute "data inspection" and the extracted ID is used in the process of the data inspection for example. The code image may also be used in such a manner that a printed sheet is determined to be a normal sheet in a case where an ID is correctly extracted from the printed sheet.

In the "data inspection," as to a printed sheet on which individual information different for each printed sheet such as an addressee or amount billed is printed, it is inspected whether an image (character string) indicating the individual information is correctly printed on the printed sheet. On each printed sheet, a code image together with a character string indicating individual information is printed, the code image having an ID embedded therein for obtaining the character string indicating the individual information to be printed.

For example, in the case of printing an invoice on a sheet, a character string indicating the total of amounts billed is assumed as an inspection item in the data inspection. An area of the correct image including the inspection item in the data inspection is referred to as a data inspection area. For example, in the memory 239, a database in which an ID indicating a billing destination is associated with a numerical value of the total of amounts billed to the billing destination is generated in advance. The inspection apparatus 109 extracts an ID from the read image and acquires from the database a numerical value indicating the total of amounts billed associated with the extracted ID. Positional information on the data inspection area, in which a character string of the inspection item (such as the total of amounts billed) in the data inspection is printed, is registered in advance. Accordingly, whether individual information is correctly printed on the printed sheet can be inspected by comparing the character string indicating the numerical value acquired based on the ID with the character string detected from the data inspection area of the printed sheet. Incidentally, a character string of the inspection item may be embedded in the code image and the inspection may be conducted by extracting the character string from the code image. The details of the data inspection will be described later.

[Comparative Example of Data Inspection Processing]

The inspection apparatus 109 according to the present embodiment is configured to read a printed sheet with the two reading units 240 and 241. For example, the reading units 240 and 241 for reading the front side of a printed sheet are the cameras 331 and 334, which are arranged side by side. In the case of reading the front side of a printed sheet, the camera 331 corresponding to the reading unit 240 captures an image of the left part of the printed sheet to thereby read the left part of the printed sheet. The camera 334 corresponding to the reading unit 241 captures an image of the right part of the printed sheet to thereby read the right part of the printed sheet. A description will be hereinafter given of the case where the reading units 240 and 241 read only the front side of a printed sheet.

The following description is based on the assumption that the width of each of the read ranges (read areas) of the reading units 240 and 241 according to the present embodiment is less than the maximum sheet width of a sheet conveyable by the image forming apparatus 101. Thus, a plurality of reading units are arranged and read images obtained from the respective reading units are combined to generate a read image of a printed sheet having the maximum sheet width. Arranging a plurality of reading units in this manner enables cost reduction as compared with the case of arranging a single reading unit capable of reading a printed sheet of the maximum sheet width.

Figure 4:
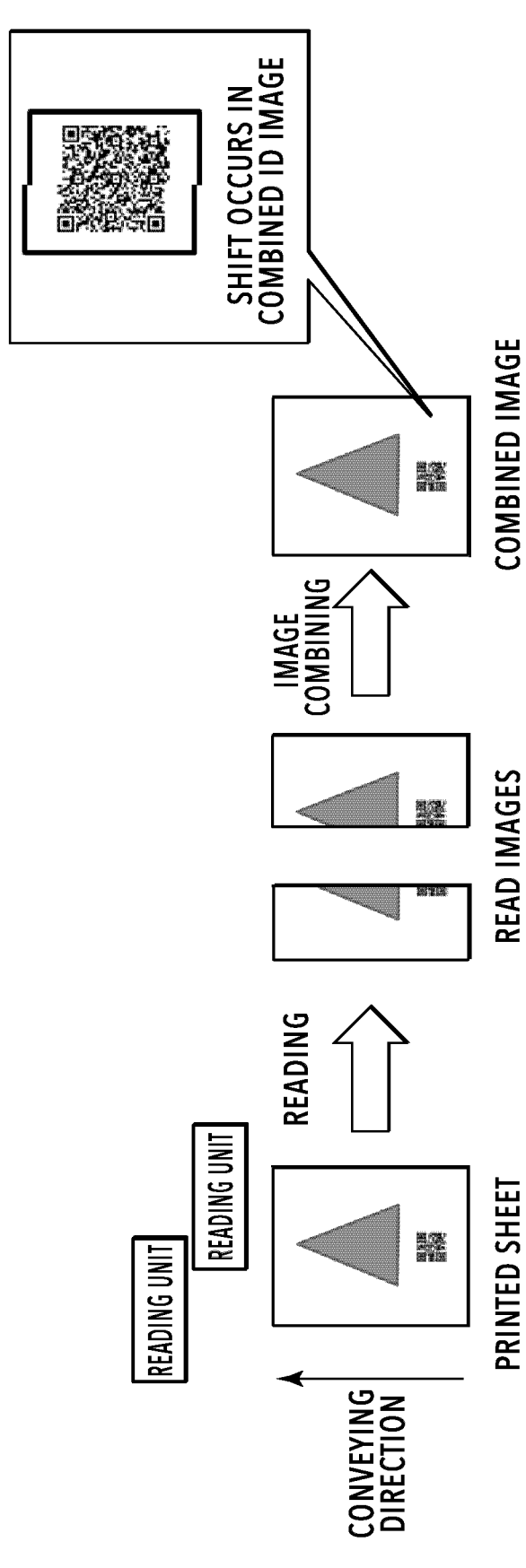
FIG. 4 is a diagram illustrating a comparative example of image combining processing.

FIG. 4 is a diagram illustrating a comparative example of a method of data inspection based on two read images obtained by reading by the two reading units 240 and 241. In the example shown in FIG. 4, the code image is a two-dimensional barcode.

In the comparative example, an ID is extracted from the two read images by reading a two-dimensional barcode from a combined image obtained by combining the two read images read by the respective reading units. However, there is a possibility of a shift at the seam of the combined image. In a case where the two-dimensional barcode is present at the seam of the combined image, if a shift is generated by combining, the two-dimensional barcode sometimes cannot be correctly read in the comparative example. Accordingly, the extraction of the ID may end in failure in the comparative example.

In view of the above, the present embodiment will explain a method of appropriately extracting an ID from two read images read by the two reading units. Incidentally, although a camera is described as an example of the reading unit for reading a printed sheet in the present embodiment, the reading unit of the present embodiment may be a scanner. That is, the camera may be replaced with a line scanner having a size in a width direction equal to that of the capturing range which is the read range of the camera. In addition, although the entire printed sheet is read by the two reading units in the present embodiment, the present embodiment may be configured to read the entire printed sheet with three or more reading units.

[Functional configuration of inspection apparatus]

FIGS. 5A and 5B are block diagrams showing a functional configuration of the inspection apparatus 109. The inspection apparatus 109 comprises a registration unit 501, a reading control unit 502, an image processing unit 503, an inspection unit 504, a display control unit 505, and a conveyance control unit 506. The inspection apparatus 109 according to the present embodiment also functions as an image processing apparatus which performs processing to conduct inspection.

The registration unit 501 performs processing to register a correct image, a data inspection area, and the like. The reading control unit 502 causes the reading units 240 and 241 to read a sheet conveyed to the inspection apparatus 109 and generates image data on the read images. The image processing unit 503 performs processing such as calculation of a feature point in an image and conversion of coordinates in an image. The inspection unit 504 performs processing to determine whether a printed sheet is a defective sheet and the like. The display control unit 505 performs control to display a screen on the display unit 242 or the like. The conveyance control unit 506 performs processing to control conveyance of a printed sheet such that the printed sheet is discharged to a tray according to the result of the inspection. These functions will be described later in detail.

The inspection unit 504 comprises an acquisition unit 507, a determination unit 508, a combining unit 509, an extraction unit 510, and an inspection processing unit 511. The functions of these units will be described later in detail with reference to the flowcharts.

The function of each unit in FIGS. 5A and 5B is implemented by the CPU 238 of the inspection apparatus 109 loading a program code stored in the memory 239 into a work memory and executing the program code. Alternatively, a part or all of the functions of the units in FIGS. 5A and 5B may be implemented by hardware such as an ASIC or electronic circuit.

[Registration Processing of Correct Image]

Figure 6:
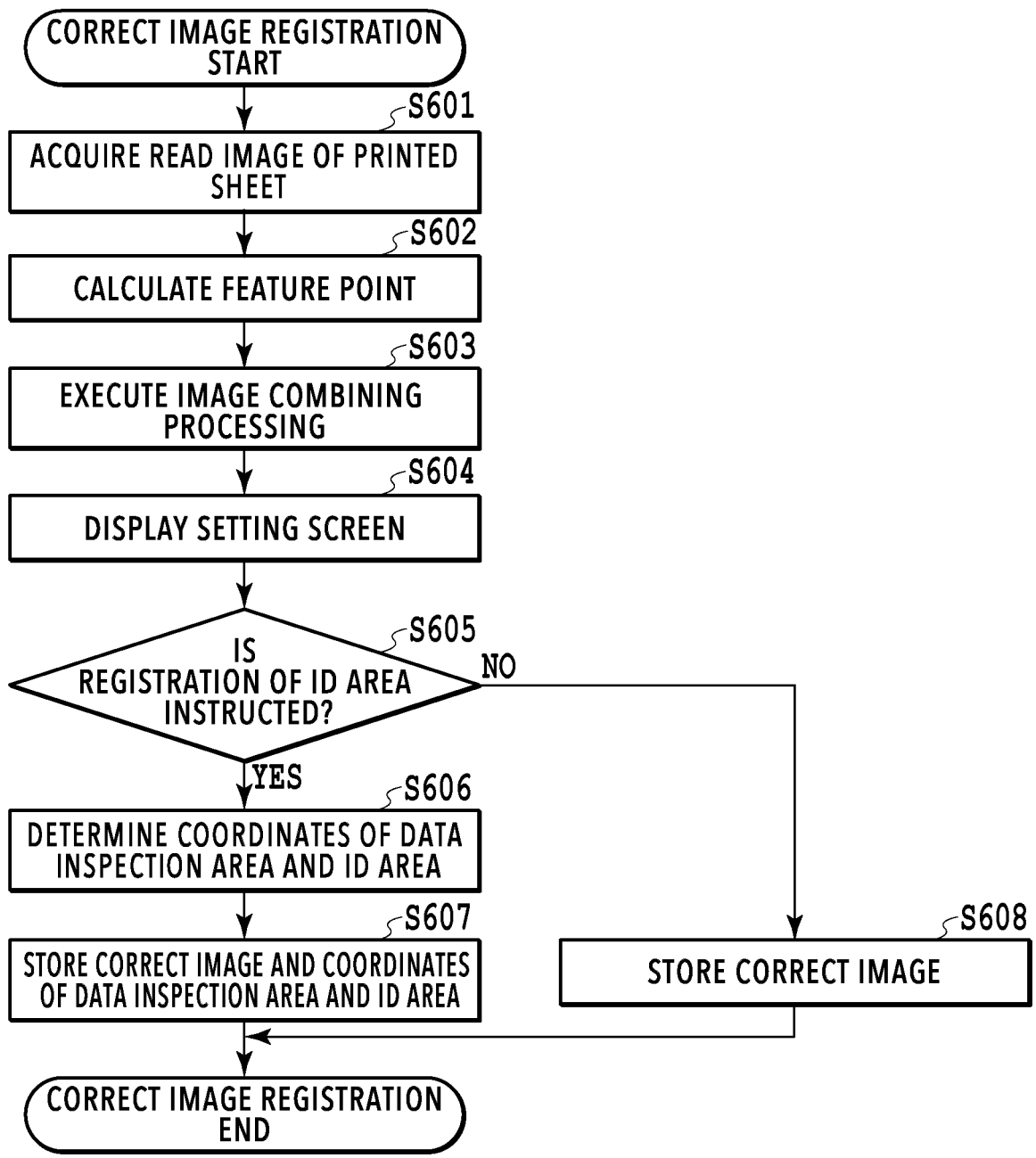
FIG. 6 is a flowchart illustrating correct image registration processing.

FIG. 6 is a flowchart showing the processing of registering a correct image. The series of processes shown in the flowchart of FIG. 6 is performed by the CPU of the inspection apparatus 109 loading a program code stored in the memory into a work memory and executing the program code. A part or all of the functions of the steps in FIG. 6 may be implemented by hardware such as an ASIC or electronic circuit. Incidentally, sign "S" in the description of the processing indicates a step in the flowchart, which also applies to the subsequent flowcharts.

The following description is based on the assumption that a printed sheet is conveyed to generate a correct image at the beginning of the flowchart. It is also assumed that the printed sheet has such a size that the entire printed sheet cannot be read by only one of the reading units 240 and 241.

In S601, the reading control unit 502 causes the reading units 240 and 241 to read the printed sheet conveyed to the inspection apparatus 109 to generate a correct image. As a result of the processing in this step, the reading control unit 502 acquires a left read image obtained by the reading unit 240 reading the left part of the printed sheet and a right read image obtained by the reading unit 241 reading the right part of the printed sheet. The two read images are stored in the memory 239.

FIGS. 7A to 7D are diagrams illustrating a correct image generated by reading the printed sheet and an ID area of the correct image, which is an area including a code image (barcode) having an ID embedded therein. FIG. 7A is a diagram showing an example of a combined image obtained by combining two read images. The printed sheet shown by the image of FIG. 7A is read in this step. It should be noted that the barcode, which is the code image, is shown in a large size in the drawings for convenience of explanation but may be actually smaller than the size shown in the drawings. FIGS. 7B to 7D will be explained later.

In S602, the image processing unit 503 performs feature point calculation processing for the two read images resulting from the processing in S601. In the feature point calculation processing, a feature point is calculated based on various feature amount calculation algorithms (such as Harris corner detection, FAST corner detection, and AKAZE).

In S603, the combining unit 509 executes combining processing to combine the two read images resulting from the processing in S601 into a single image.

In S604, the display control unit 505 displays a setting screen on the display unit 242.

Figure 8A:
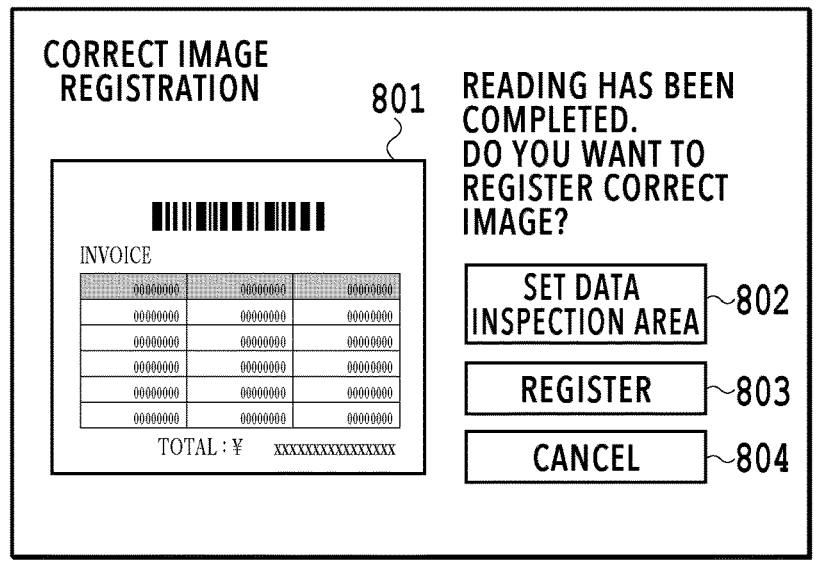
FIGS. 8A to 8C are diagrams of setting screens for setting the ID area and a data inspection area.
Figure 8B:
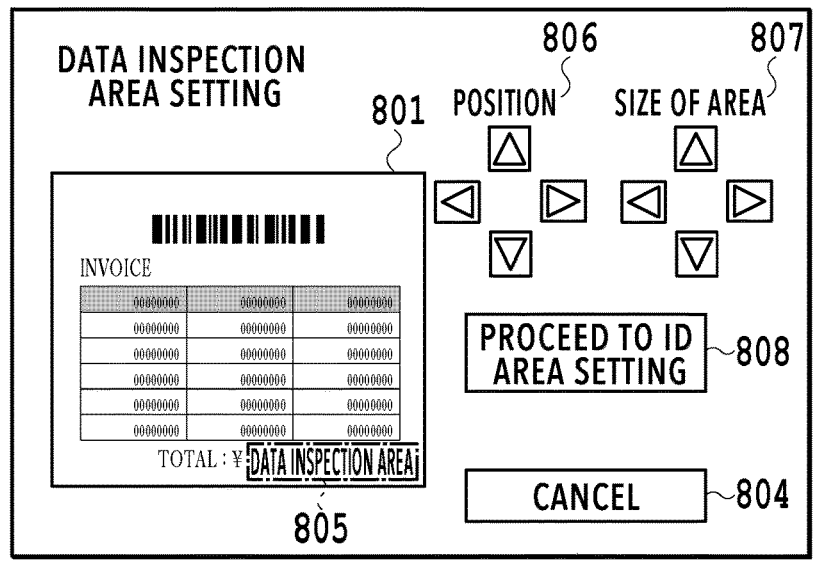
Figure 8C:
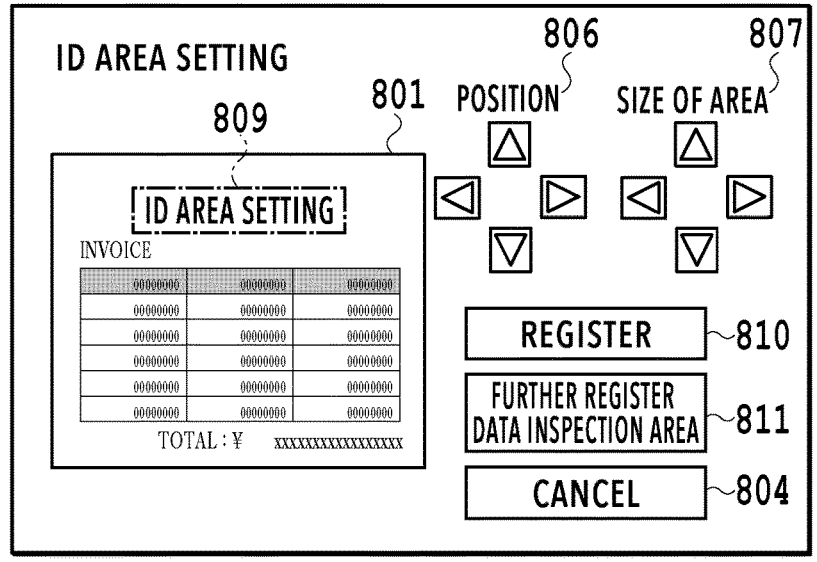

FIGS. 8A to 8C are diagrams showing an example of setting screens displayed in S604. FIG. 8A is an example of a setting screen displayed on the display unit 242 of the inspection apparatus 109 after the completion of generation of the combined image. A display area 801 is an area to display the combined image generated in S603. A button 802 is a button to transition to a screen for setting positional information on a data inspection area. As described above, the data inspection area is an area in which individual information to be subjected to data inspection is printed.

A registration button 803 is a button for a user to instruct registration of a correct image after checking the image displayed in the display area 801. At the press of the registration button 803, the registration unit 501 executes only the processing of registering the combined image as a correct image without registering a data inspection area or ID area. In other words, in the case of not instructing the execution of data inspection, a user presses the registration button 803.

A cancel button 804 is a button to cancel the registration processing. At the press of the cancel button 804, the registration unit 501 terminates the registration processing without registering a correct image. The flowchart of FIG. 6 shows the case where the cancel button 804 is not pressed.

FIG. 8B is a diagram showing an example of a setting screen for setting a data inspection area displayed after the press of the button 802. Position change buttons 806 are buttons to designate the position of a data inspection area 805. Size change buttons 807 are buttons to designate the size of the data inspection area 805. By operating the position change buttons 806 and size change buttons 807, a user can designate the position and size of the data inspection area 805 in the sheet.

A button 808 is a button to transition to a setting screen for setting an ID area. As described above, the ID area is an area in which a code image such as a one- or two-dimensional barcode is printed. In the following description, it is assumed that the code image in which an ID is embedded is a one-dimensional barcode.

FIG. 8C is a diagram showing an example of a setting screen for setting an ID area displayed after the press of the button 808. In the setting screen of FIG. 8C, the position change buttons 806 are used to designate the position of an ID area 809. The size change buttons 807 are also used to designate the size of the ID area 809. Like the setting screen of FIG. 8B, the setting screen of the FIG. 8C enables designation of the position and size of the ID area in the sheet.

A registration button 810 is a button for a user to instruct registration of the positions and sizes of the data inspection area and ID area designated by the user after confirmation. At the press of the registration button 810, the registration unit 501 registers the combined image as a correct image and further registers the data inspection area and the ID area.

Incidentally, since the number of code images with IDs embedded therein to be printed on a sheet is not limited to one, the number of ID areas designated by a user is also not limited to one. The same can be said of the data inspection area. A button 811 is a button to transition to a setting screen for setting an unregistered data inspection area or ID area in the case of designating a plurality of data inspection areas and a plurality of ID areas. At the press of the button 811, the screen transitions to the setting screen of FIG. 8B, where a user can set an unregistered data inspection area. An unregistered ID area can be set by further pressing the button 808.

Incidentally, on a printed sheet for generating a correct image, a code image does not have to be actually printed and a temporary code image may be printed. In a case where a common code image is printed on all sheets, that code image may be printed.

Returning to FIG. 6, the description of the registration processing is continued. In S605, the registration unit 501 determines whether the registration of an ID area is instructed. That is, the registration unit 501 determines whether the registration button 810 is pressed in the setting screen of FIG. 8C. If the registration of an ID area is instructed (YES in S605), the processing transitions to S606.

In S606, the registration unit 501 determines coordinates of the data inspection area and ID area. More specifically, the registration unit 501 derives coordinates, which are positional information on the data inspection area and ID area, from the positions and sizes of the data inspection area 805 and ID area 809 designated via the setting screens of FIG. 8B and FIG. 8C.

The image shown in FIG. 7A is an example of the combined image registered as a correct image corresponding to one page. FIG. 7B is a diagram showing the position of an ID area in the correct image designated via the setting screen of FIG. 8C. FIG. 7B shows that an area P1-1 other than the gray area is registered as an ID area. The area P1-1 is determined based on the position and size of the ID area 809 superimposed on the correct image in the display area 801 of FIG. 8C at the time of pressing the registration button 810 or button 811. FIG. 7C is valid image data obtained by cutting the ID area from the correct image.

FIG. 7D is data on positional information indicating the position and size of the ID area. The positional information is information on coordinates of four corners (upper left, upper right, lower left, lower right) of the area P1-1 shown in FIG. 7B. The registration unit 501 determines the coordinates of the four corners indicating the position and size of the ID area designated in the setting screen of FIG. 8C. The registration unit 501 also performs similar processing for the data inspection area.

In S607, the registration unit 501 stores, in the memory 239, the positional information on the data inspection area and ID area determined in S606. The registration unit 501 also stores, in the memory 239, the combined image generated in S603 as a correct image. If the registration of a plurality of ID areas is instructed, pieces of positional information on the ID areas are stored by the number of ID areas.

In contrast, if the registration of an ID area is not instructed (NO in S605), the processing transitions to S608. In other words, if the registration button 803 is pressed in the setting screen of FIG. 8A, the processing transitions to S608. In S608, the registration unit 501 stores the combined image as a correct image in the memory 239.

[Inspection Processing]

Figure 9:
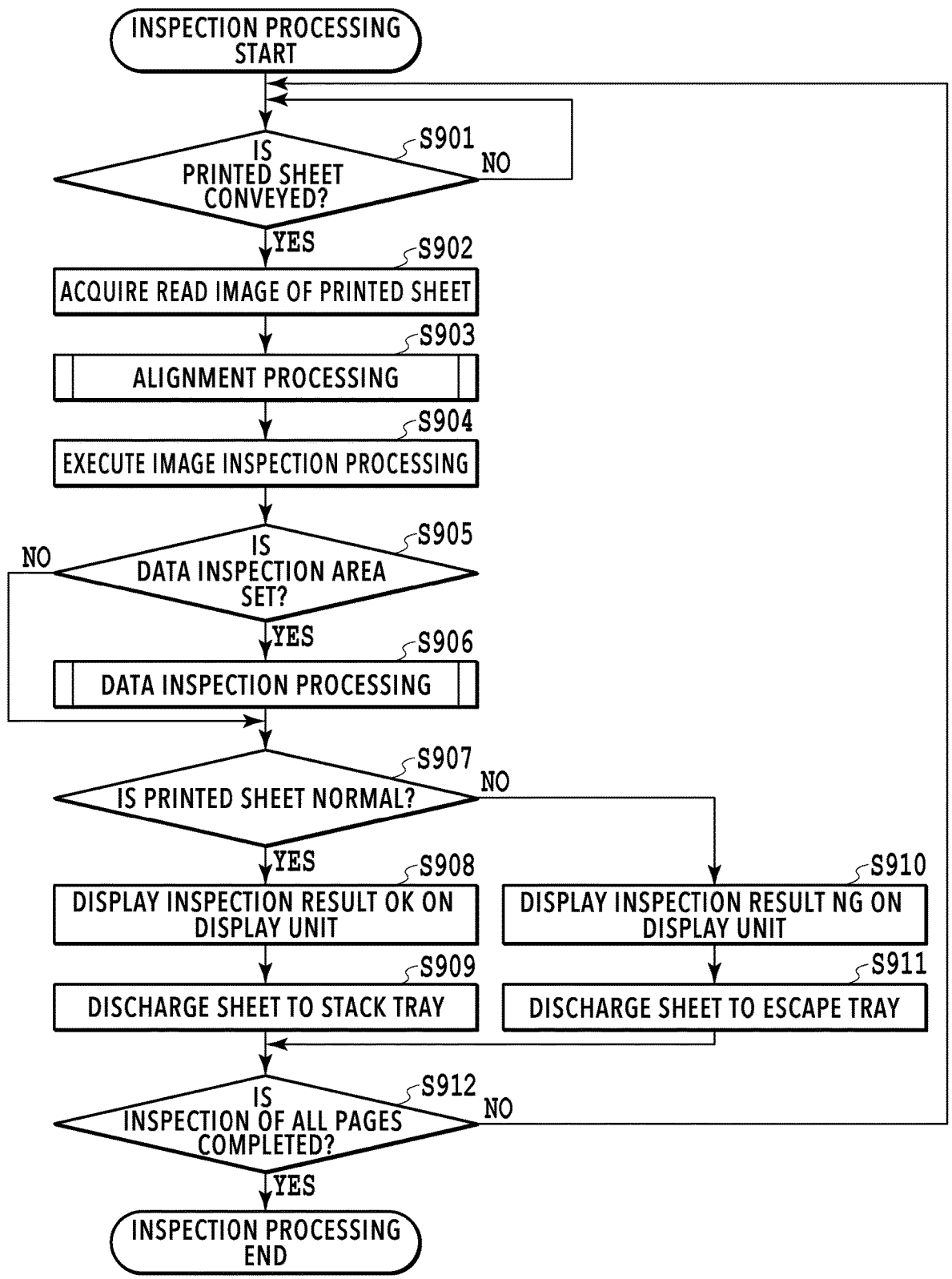
FIG. 9 is a flowchart illustrating inspection processing.

FIG. 9 is a flowchart showing the inspection processing in the inspection apparatus 109. The following description of the flowchart is based on the assumption that an inspection target printed sheet has such a size that the entire printed sheet cannot be read by only one of the reading units 240 and 241. It is also assumed that the printed sheet is a sheet on which an image has been printed based on the registered correct image.

The reading control unit 502 of the inspection apparatus 109 monitors whether a printed sheet is conveyed to the inspection apparatus 109. In S901, the reading control unit 502 determines whether a sheet is conveyed. If the conveyance of a sheet is detected, it is determined that the sheet is conveyed and the processing transitions to S902. The sheet detected in this step is referred to as an inspection target sheet.

In S902, the reading control unit 502 causes the reading units 240 and 241 to read the inspection target printed sheet conveyed to the inspection apparatus 109. The acquisition unit 507 acquires a left read image obtained by the reading unit 240 reading the left part of the inspection target sheet and a right read image obtained by the reading unit 241 reading the right part of the inspection target sheet. The two read images are stored in the memory 239.

In S903, alignment processing is performed to align coordinates in each of the read images acquired in S902 with coordinates in the correct image.

Figure 10:
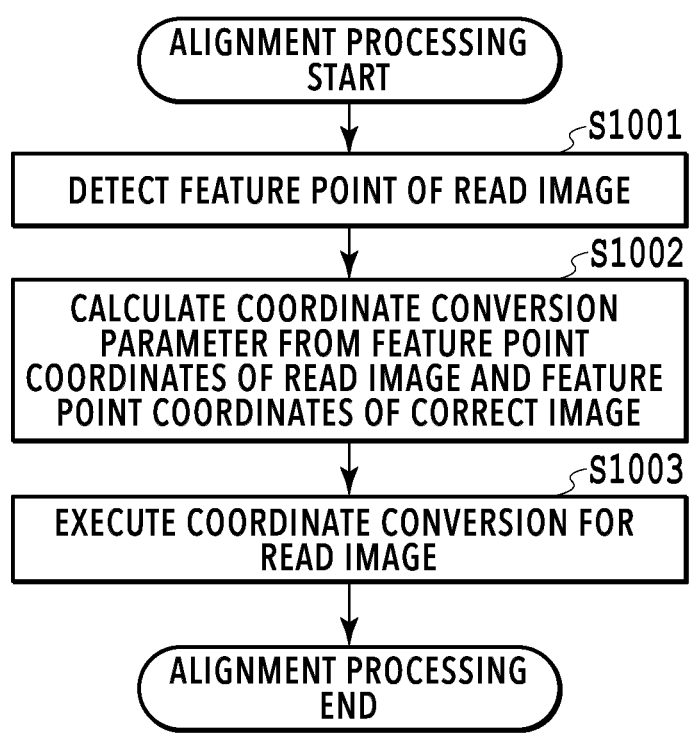
FIG. 10 is a flowchart illustrating alignment processing.

FIG. 10 is a flowchart showing the alignment processing. The processing in S903 will be described in detail with reference to FIG. 10.

In S1001, the image processing unit 503 performs feature point calculation processing for each of the read images acquired in S902. In the feature point calculation processing, a feature point is calculated based on various feature amount calculation algorithms (such as Harris corner detection, FAST corner detection, and AKAZE).

In S1002, the image processing unit 503 calculates a coordinate conversion parameter for aligning the coordinates in the read images with the coordinates in the correct image based on the feature point coordinates of the read images calculated in S1001 and the feature point coordinates of the correct image calculated in S602.

In S1003, the image processing unit 503 performs coordinate conversion processing for the read images using the coordinate conversion parameter calculated in S1002. By performing the coordinate conversion processing, the coordinates in each of the read images are converted into coordinates corresponding to the correct image. Incidentally, it is assumed here that the coordinates in the images are expressed by a coordinate system in which the upper left corner is an origin point, the vertical direction is a y-direction, and the horizontal direction is an x-direction.

Returning to FIG. 9, the description of the inspection processing is continued. In S904, the inspection processing unit 511 performs image inspection to determine whether the printed sheet is a defective sheet. In the present embodiment, each of the read images acquired in S902 and having the coordinates converted in S903 is inspected as an inspection image for the inspection in this step. The image inspection executed in this step is different from data inspection to be described later.

A method of the image inspection in this step will be described. First, a value of a difference in pixel value between the correct image and the inspection image is calculated for each pixel. Next, the inspection result is determined based on the maximum difference value. For example, if the maximum difference value is equal to or greater than a threshold, the inspection target printed sheet is determined to be a defective sheet. Alternatively, the inspection target printed sheet may be determined to be a defective sheet if the number of pixels having a difference value equal to or greater than a threshold exceeds a predetermined number. In a case where each of the read images obtained from a plurality of reading units is compared with the correct image, it is determined whether all the read images obtained from the reading units match the correct image.

In a case where a data inspection area is set, it may be determined in the image inspection in this step whether the sheet is a defective sheet based on difference values of pixels in an area other than the data inspection area. Alternatively, in a case where a data inspection area is set, there is a possibility that a character string different for each printed sheet is included in addition to the data inspection area as in the case of an invoice. Accordingly, in a case where a data inspection area is set, the image inspection in this step may be skipped and only the subsequent inspection processing may be executed.

In S905, it is determined whether positional information on the data inspection area is stored by the processing in S607. If the data inspection area is stored (YES in S905), the processing transitions to S906 and the data inspection processing is executed. If the data inspection area is not stored (NO in S905), the data inspection processing is skipped and the processing advances to S907.

Figure 11:
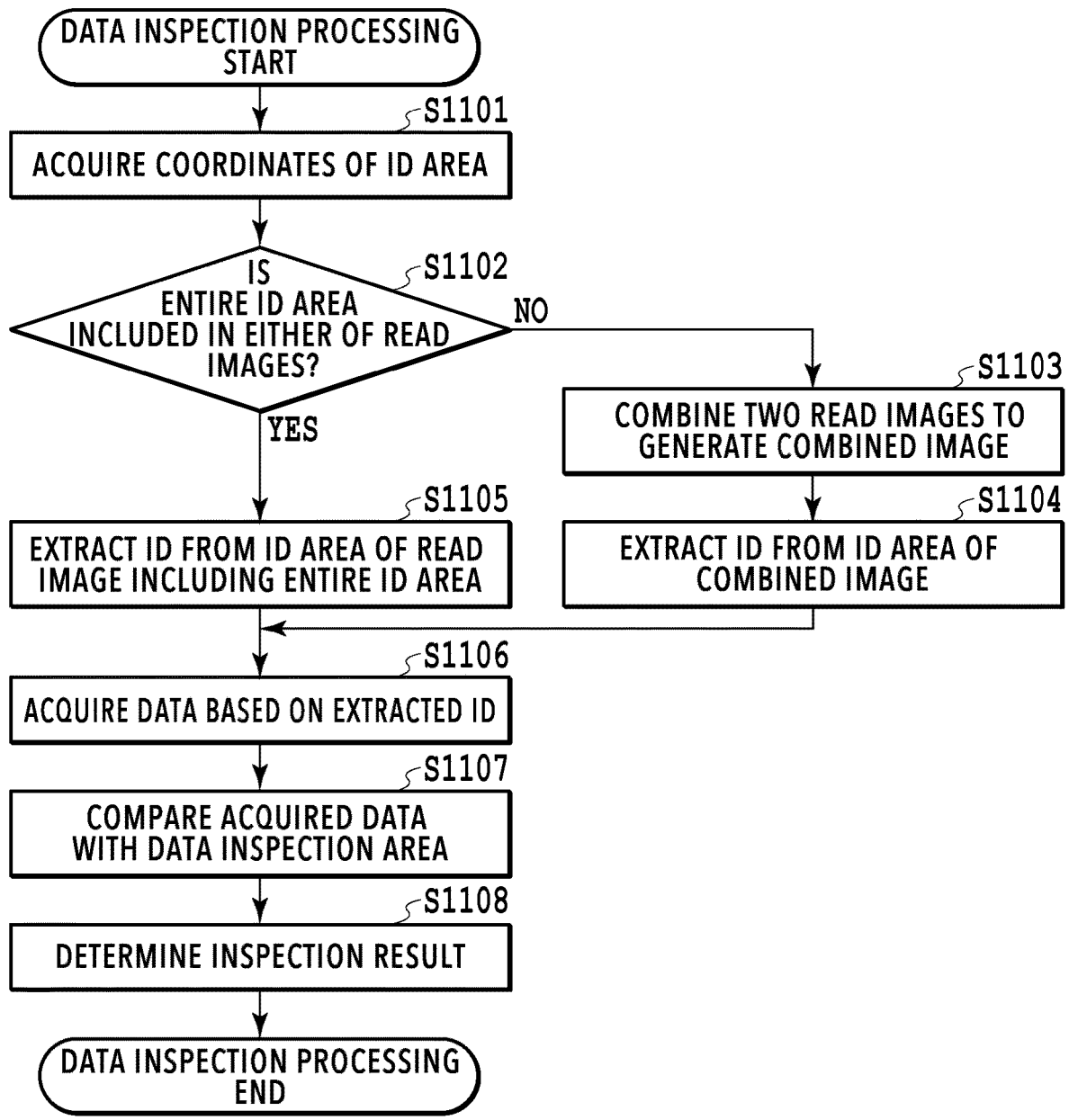
FIG. 11 is a flowchart illustrating data inspection processing.

FIG. 11 is a flowchart showing the data inspection processing. The data inspection processing executed in S906 will be described in detail with reference to FIG. 11.

In S1101, the acquisition unit 507 acquires positional information (coordinates) on the ID area indicating the position of the data image in the sheet stored in the memory 239 as a result of the processing in S607.

In S1102, the determination unit 508 compares the coordinates indicating the position of the ID area with the coordinates of the read images aligned in S903. Based on the result of comparison, the determination unit 508 determines which of the read images obtained from the reading units 240 and 241 is a read image including the entire ID area.

Figures 12A, 12B:
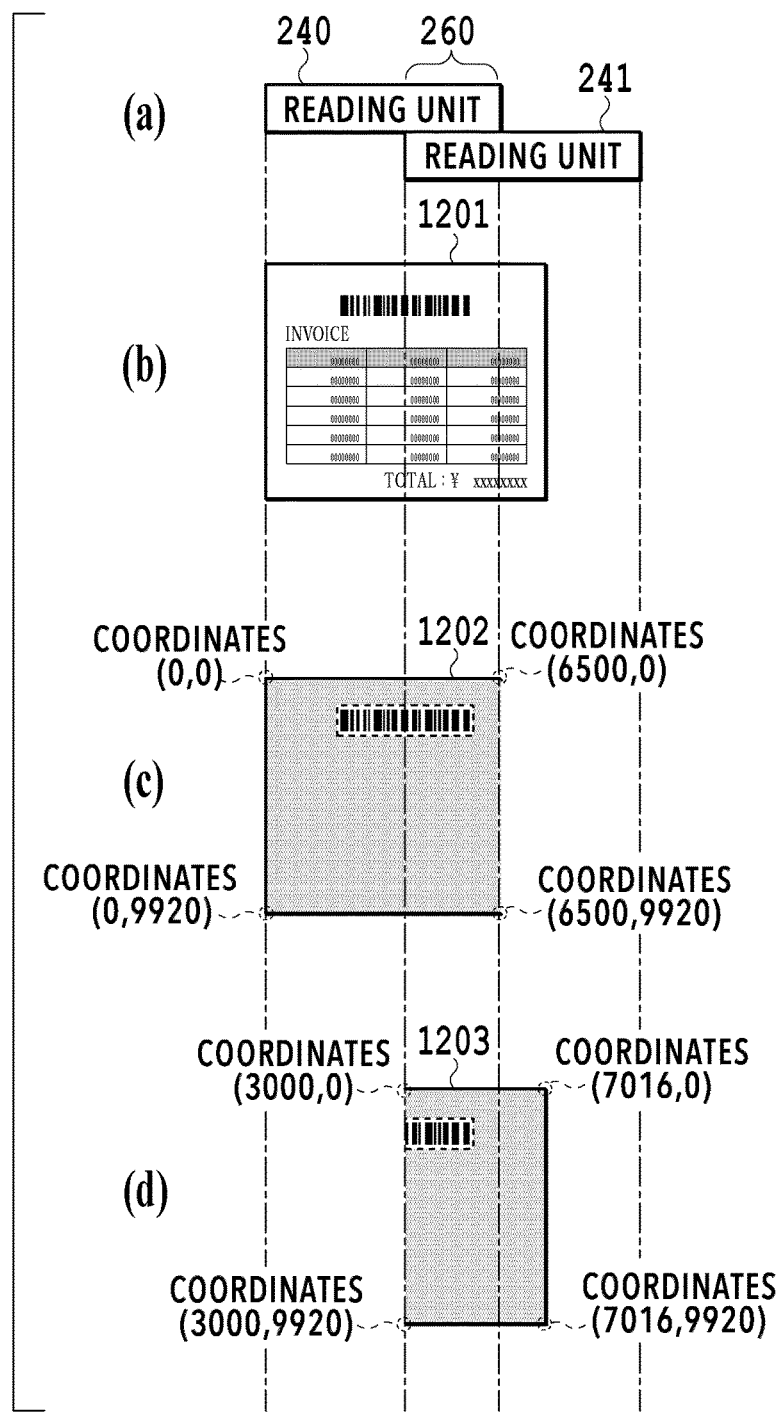
FIGS. 12A and 12B are diagrams illustrating an example of read images and the ID area.

FIG. 12A is diagram illustrating read images obtained from the reading units 240 and 241. In the part (a) of FIG. 12A, the positions of the reading units 240 and 241 indicate the positions of the read ranges of the respective reading units 240 and 241. That is, it is shown that the reading unit 240 reads the left part of the printed sheet and the reading unit 241 reads the right part of the printed sheet. The widths of the reading units 240 and 241 in the part (a) of FIG. 12A indicate maximum widths readable by the respective reading units 240 and 241.

The reading units 240 and 241 are arranged such that there is an area in which the read range of the reading unit 240 overlaps the read range of the reading unit 241. This area readable by both of the reading units 240 and 241 is referred to as an overlap area 260. The overlap area 260 is an area between the left end of the reading unit 241 and the right end of the reading unit 240 and is set in consideration of a sheet conveyance shift.

The part (b) of FIG. 12A is a diagram showing an inspection target printed sheet 1201 read by the reading units 240 and 241. The part (b) of FIG. 12A shows that the printed sheet is read such that the left end of the printed sheet 1201 is aligned with the left end of the read range of the reading unit 240. It is assumed that the positions and sizes of the printed sheet 1201 and ID area have the same coordinates as those of the correct image shown in FIG. 7B.

The part (c) of FIG. 12A is a diagram showing a read image 1202 obtained by the reading unit 240 reading the printed sheet 1201. The read image 1202 is shown omitting the illustration of an image in an area other than the area having the barcode, or the ID area. The sheet width of the printed sheet 1201 is greater than the read range of the reading unit 240. Thus, it is shown that the printed sheet 1201 is read such that the left end of the printed sheet 1201 is aligned with the left end of the read range of the reading unit 240, with the result that the read image 1202 is generated without a portion of the right part of the printed sheet 1201. The coordinates of the four corners (upper left, upper right, lower left, lower right) of the read image 1202 correspond to the correct image resulting from the alignment processing in S903.

The part (d) of FIG. 12A is a diagram showing a read image 1203 obtained by the reading unit 241 reading the printed sheet 1201. The read image 1203 is shown omitting the illustration of an image other than the barcode. It is shown that the read image 1203 is obtained by reading the right part of the printed sheet 1201. The coordinates of the four corners of the read image 1203 correspond to the correct image resulting from the alignment processing in S903. FIG. 12B is a table providing a summary of the coordinate values of the four corners, that is, the upper left, upper right, lower left, and lower right corners, of each of the read images 1202 and 1203.

In FIG. 12A, the read image 1202 obtained from the reading unit 240 includes the entire ID area (barcode). In this case, the determination unit 508 determines in S1102 that there is a read image including the entire ID area. If the entire ID area is included in any of the read images (YES in S1102), the processing transitions to S1105.

In S1105, the extraction unit 510 reads the barcode, which is a code image having an ID embedded therein, from the ID area of the read image including the entire ID area. In the case of FIG. 12A, the barcode is read from the read image 1202 of (c) in FIG. 12A. Accordingly, in the present embodiment, the correct barcode can be read from the image without any pixel shift caused by combining. As a result, the ID of the inspection target printed sheet can be correctly extracted. After the completion of the processing in this step, the processing advances to S1106.

Figures 13A, 13B:
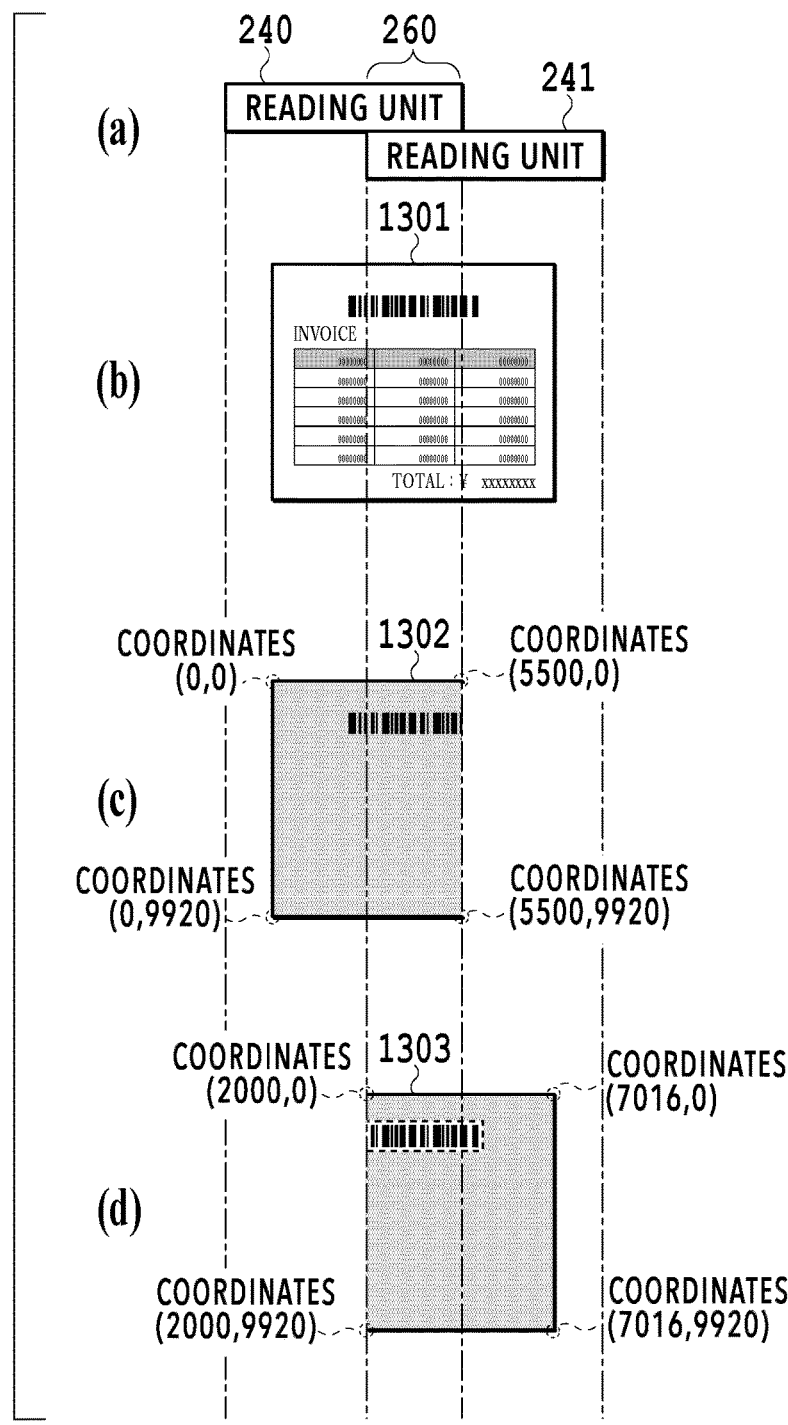
FIGS. 13A and 13B are diagrams illustrating an example of read images and the ID area.

FIG. 13A is diagram illustrating read images obtained from the reading units 240 and 241. The part (a) of FIG. 13A is identical to the part (a) of FIG. 12A. The part (b) of FIG. 13A is a diagram showing a printed sheet 1301 read by the reading units 240 and 241. The part (b) of FIG. 13A shows that the printed sheet 1301 is read while being conveyed with its left end not aligned with the left end of the read range of the reading unit 240.

The part (c) of FIG. 13A is a diagram showing a read image 1302 obtained by the reading unit 240 reading the printed sheet 1301. The coordinates of the four corners of the read image 1302 correspond to the correct image resulting from the alignment processing in S903. The part (d) of FIG. 13A is a diagram showing a read image 1303 obtained by the reading unit 241 reading the printed sheet 1301. It is shown that the read image 1303 is obtained by reading the right part of the printed sheet 1301. The coordinates of the four corners of the read image 1303 correspond to the correct image resulting from the alignment processing in S903. Incidentally, the read images 1302 and 1303 are shown omitting the illustration of an image other than the barcode. FIG. 13B is a table providing a summary of the coordinate values of the four corners of each of the read images 1302 and 1303.

In FIG. 13A, neither the read image 1302 obtained from the reading unit 240 nor the read image 1303 obtained from the reading unit 241 includes the entire ID area. In this case, the determination unit 508 determines in S1102 that there is no read image including the entire ID area. If there is no read image including the entire ID area (NO in S1102), the processing transitions to S1103.

In S1103, the combining unit 509 performs processing to generate a single image (combined image) by combining the read image obtained from the reading unit 240 with the read image obtained from the reading unit 241.

In S1104, the extraction unit 510 performs processing to read the barcode indicating the ID from the ID area in the combined image generated in S1103. The ID of the inspection target printed sheet is extracted by reading the barcode. If the extraction of the ID is completed, the processing advances to S1106.

In S1106, the acquisition unit 507 acquires data on an image (character string) to be printed in the data inspection area of the read image. More specifically, the acquisition unit 507 first acquires an image (character string) indicating individual information associated with the ID of the inspection target printed sheet from the database in which the ID indicating the printed sheet is associated with the individual information.

For example, in a case where an invoice is printed on a sheet like the printed sheet in FIGS. 12A and 13A and the individual information is a character string indicating the total of amounts billed in the invoice, the acquisition unit 507 acquires a character string indicating the total corresponding to the inspection target printed sheet.

In S1107, the inspection processing unit 511 compares data on the individual information acquired in S1106 with the image of the data inspection area of the read image. The data inspection area is an area of the printed sheet in which the individual information is printed and the positional information thereof is stored by the processing in S607. For example, in a case where the individual information is a character string, a character string obtained by performing character recognition processing for the data inspection area is compared with the character string indicating the individual information acquired in S1106. In a case where an image is acquired as the individual information, a difference value between each pixel in the data inspection area of the read image and the corresponding pixel in the image acquired as the individual information may be calculated. Alternatively, the inspection may be conducted by comparing data on the data inspection area of a combined image obtained by combining two read images with data on the individual information.

In S1108, the inspection processing unit 511 determines from the result of the data inspection whether the inspection target printed sheet is a defective sheet or a normal sheet that is not the defective sheet. For example, in a case where character strings are compared in S1107, if there is a mismatch between the character strings, the inspection target printed sheet is determined to be a defective sheet. In a case where pixel values are compared in S1107, if the maximum difference value the between pixel values is equal to or greater than a threshold, the inspection target printed sheet is determined to be a defective sheet. If the inspection target printed sheet is not a defective sheet, the inspection processing unit 511 determines that the inspection target printed sheet is a normal sheet.

Returning to FIG. 9, the description of the inspection processing as a whole is continued. In S907, the inspection processing unit 511 determines whether the inspection target printed sheet is normal based on the results of the image inspection in S904 and data inspection in S906.

If the inspection target printed sheet is not determined to be a defective sheet in either of the image inspection in S904 and the data inspection in S906, the inspection target printed sheet is determined to be normal in this step. If the inspection target printed sheet is normal, the processing transitions to S908. In contrast, if the inspection target printed sheet is determined to be a defective sheet in either the image inspection in S904 or the data inspection in S906, the inspection target printed sheet is not determined to be normal in this step and the processing transitions to S910.

If the inspection target printed sheet is normal (YES in S907), the display control unit 505 displays in S908 that the inspection result is OK on the display unit 242 of the inspection apparatus 109. The processing then advances to S909. In S909, the conveyance control unit 506 performs control such that the inspection target printed sheet is discharged to the stack tray 341 of the large capacity stacker 110.

If the inspection target printed sheet is not normal (NO in S907), the display control unit 505 displays in S910 that the inspection result is NG on the display unit 242 of the inspection apparatus 109. The processing then advances to S911. In S911, the conveyance control unit 506 performs control such that the inspection target printed sheet is discharged to the escape tray 346 of the large capacity stacker 110.

Incidentally, in S908 and S910, the display control unit 505 may perform control such that the inspection result is displayed on a display unit other than the display unit 242 of the inspection apparatus 109. For example, the inspection result may be displayed on the display 205 of the PC 103.

In S912, it is determined whether the inspection of all pages is completed. If the inspection of all the pages is not completed, the processing transitions to S901 to inspect the next page. If the inspection is completed up to the last page, the processing is finished.

As described above, according to the present embodiment, even in a case where an ID is extracted from a plurality of read images obtained by a plurality of reading units reading a printed sheet, a failure in extraction of the correct ID can be suppressed. Therefore, according to the present embodiment, the accuracy of the inspection of the printed sheet can be improved.

Second Embodiment

The inspection processing according to the first embodiment uses the method of comparing each of the read images obtained by reading by the reading units 240 and 241 with the correct image. In the second embodiment, a description will be given of a method of conducting inspection by combining the read images obtained by reading by the reading units 240 and 241 into a combined image and comparing the combined image with the correct image.

In the present embodiment, differences between the present embodiment and the first embodiment will be mainly described. The same configuration and processing as those of the first embodiment will not be particularly explained.

Figure 14:
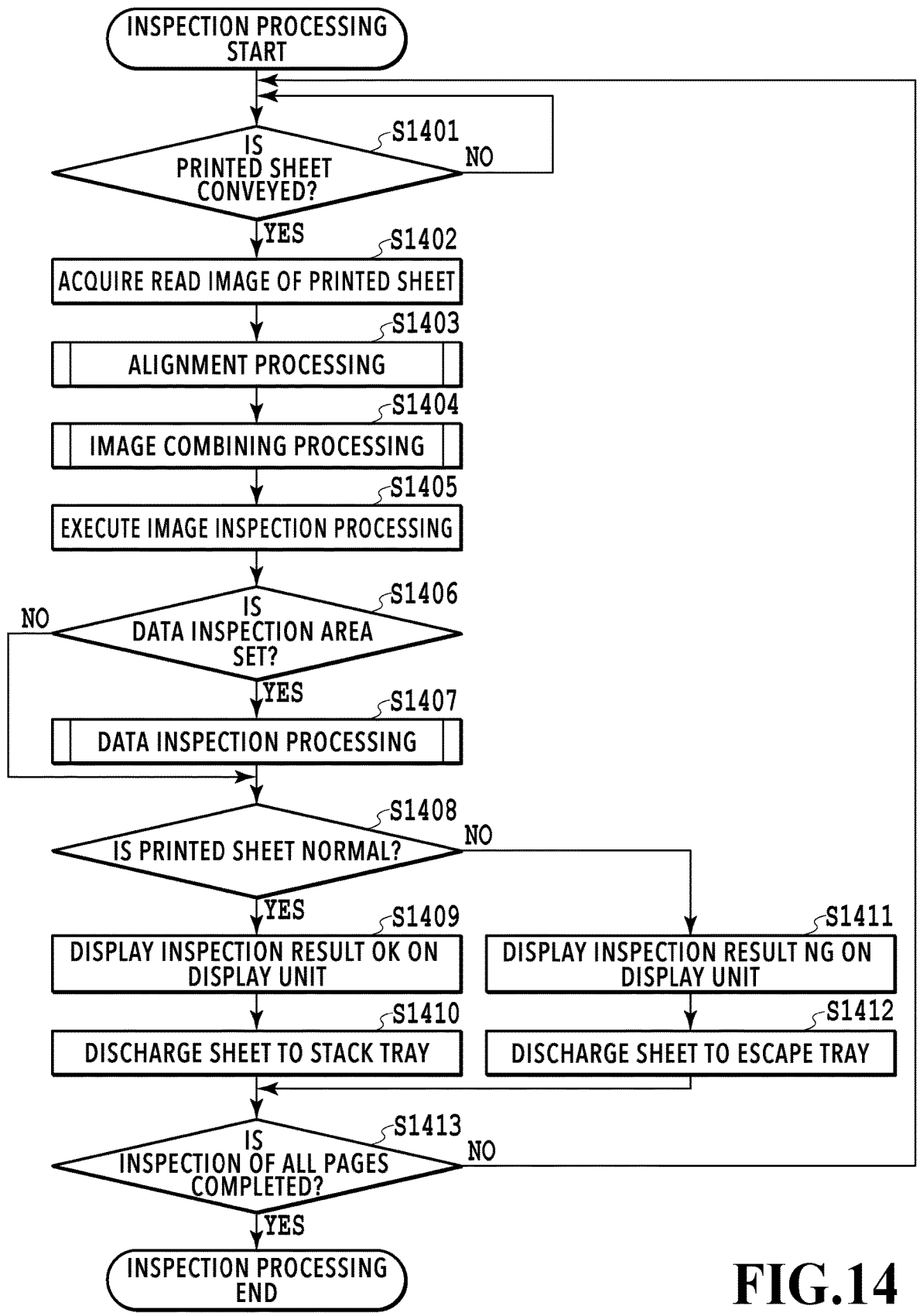
FIG. 14 is a flowchart illustrating inspection processing.

FIG. 14 is a flowchart showing the inspection processing according to the present embodiment. Since the processing from S1401 to S1402 is identical to that from S901 to S902, the description thereof is omitted. Similarly, since the processing from S1408 to S1413 is identical to that from S907 to S912 of the first embodiment, the description thereof is omitted.

In the inspection processing according to the present embodiment, the processing of combining read images is performed in S1404, which is subsequent to the alignment processing (S1403) and precedent to the image inspection processing (S1405) and the data inspection processing (S1407). More specifically, in S1404, the processing is executed to combine the read images, which are obtained by the respective reading units 240 and 241 reading the inspection target printed sheet, into a single image.

Figure 15:
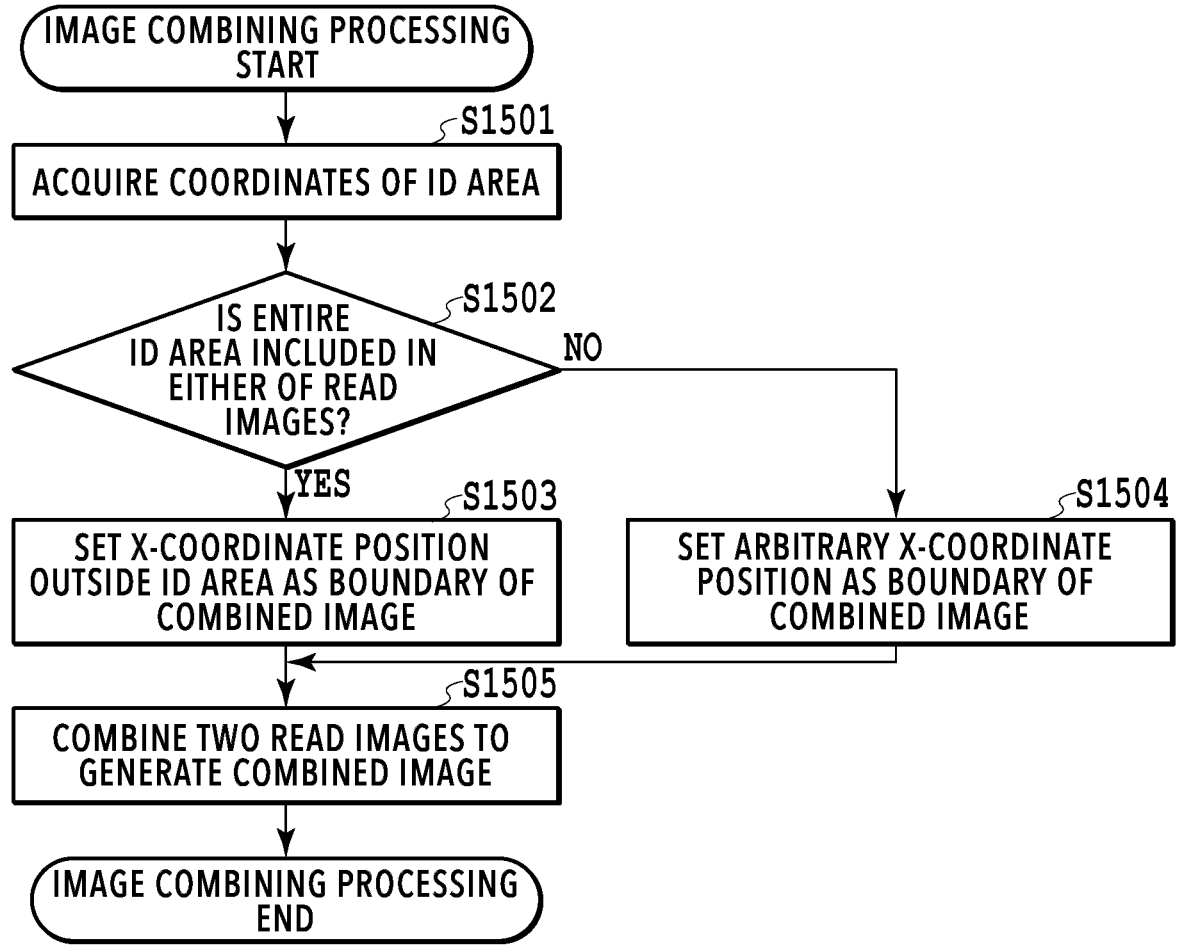
FIG. 15 is a flowchart illustrating image combining processing.

FIG. 15 is a flowchart of the image combining processing. The processing in S1404 will be described in detail with reference to FIG. 15.

In S1501, the acquisition unit 507 acquires the positional information on the ID area stored in the memory 239 as a result of the processing in S607.

The processing in S1502 is identical to that in S1102 in the data inspection processing according to the first embodiment. That is, the determination unit 508 determines whether there is a read image including the entire ID area. If the entire ID area is included in either one of the read images (YES in S1502), the processing transitions to S1503.

In S1503, the combining unit 509 sets an x-coordinate position which is inside an area of the read image corresponding to the overlap area 260 and is outside the ID area as a boundary between the read images at the time of image combining.

Figure 16:
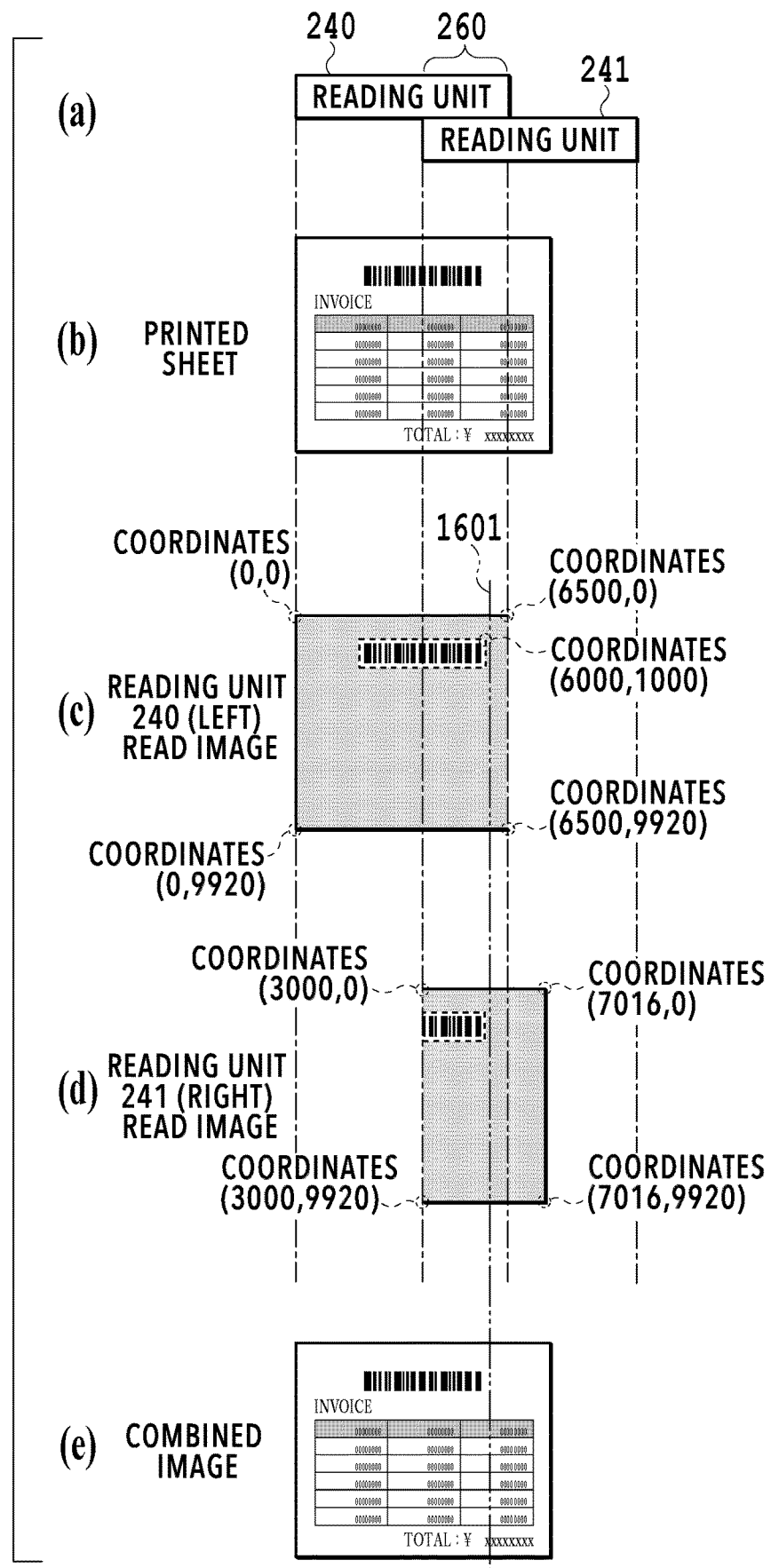
FIG. 16 is diagram illustrating an example of read images, the ID area, and a combined image.

FIG. 16 is diagram illustrating read images obtained from the reading units 240 and 241. The part (a) of FIG. 16 is a diagram identical to the part (a) of FIG. 12A showing the read ranges of the reading units 240 and 241. The part (b) of FIG. 16 is a diagram showing an inspection target printed sheet read by the reading units 240 and 241.

The part (c) of FIG. 16 is a diagram showing the size of a read image obtained by the reading unit 240 reading the printed sheet. The part (d) of FIG. 16 is a diagram showing the size of a read image obtained by the reading unit 241 reading the printed sheet. The coordinate values in the parts (c) and (d) of FIG. 16 are an example of coordinates calculated as a result of the alignment processing in S1403.

In the read image of (c) in FIG. 16, the entire ID area (barcode) shown by a dashed line rectangle is located within the image. In contrast, in the read image of (d) in FIG. 16, only a part of the ID area (barcode) is located within the image. Thus, in the case of reading the printed sheet of (b) in FIG. 16, it is determined in S1502 that either one of the read images includes the entire ID area.

A boundary 1601 shown by a chain double-dashed line in FIG. 16 is an example of the boundary set in S1503. If there is a read image including the entire ID area, the boundary is set in S1503 such that an x-coordinate of the boundary 1601 is located inside the overlap area 260 and outside the ID area. More specifically, the boundary is set between an x-coordinate (6000) of the right end of the barcode and an x-coordinate (6500) of the right end of the read image obtained from the reading unit 240. By setting the boundary in this manner, a combined image is generated such that the boundary is not located in the ID area of the combined image.

In contrast, if there is no read image including the entire ID area (NO in S1502), the processing transitions to S1504. In S1504, the combining unit 509 sets an x-coordinate position in the image corresponding to the overlap area 260 as a boundary between the images at the time of image combining.

In 51505, the combining unit 509 generates a single combined image by combining the read image obtained from the reading unit 240 with the read image obtained from the reading unit 241 such that the two read images are connected at the boundary set in S1503 or S1504.

The part (e) of FIG. 16 is a diagram showing a combined image obtained as a result of combining the read image of (c) in FIG. 16 with the read image of (d) in FIG. 16 such that the read images are connected at the boundary 1601. By generating a combined image such that the boundary 1601 is not included in the ID area having the barcode, a pixel shift caused by combining can be suppressed in the ID area of the combined image.

Returning to FIG. 14, the description of the inspection processing according to the present embodiment is continued. In S1405, the inspection processing unit 511 executes the image inspection. The image inspection according to the present embodiment is executed by using the combined image generated in S1404 as an inspection image and comparing the inspection image with the correct image stored in the memory 239.

In S1406, it is determined whether the data inspection area is stored like S905. If the data inspection area is stored, the processing advances to S1407 to execute the data inspection.

Figure 17:
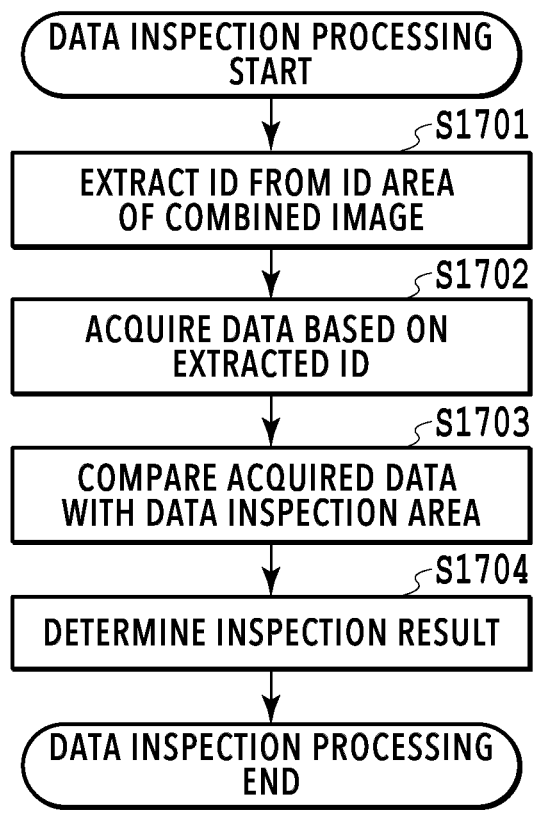
FIG. 17 is a flowchart illustrating data inspection processing.

FIG. 17 is a flowchart showing the data inspection processing according to the present embodiment. The details of S1407 will be described with reference to FIG. 17. In the present embodiment, since the combined image is generated before the data inspection, the data inspection processing does not include the determination in S1102 and the processing of generating the combined image in S1103, which are described in the first embodiment.

In S1701, the extraction unit 510 performs processing to extract the ID from the ID area of the combined image generated in S1404. If the extraction of the ID is completed, the processing advances to S1702. The combined image of the present embodiment is generated in such a manner that if there is a read image including the entire ID area, the boundary of the combined image is not included in the ID area. Accordingly, if there is a read image including the entire ID area, the ID area of the combined image includes an image of the ID area of the read image including the entire ID area. Therefore, the correct ID can be extracted from the combined image.

Since S1702 to S1704 are identical to S1106 to S1108, the description thereof is omitted.

Incidentally, in S1703, data on individual information acquired based on the extracted ID is compared with data on the data inspection area of the combined image. For example, in a case where the individual information is a character string, a character string obtained by performing character recognition processing for the data inspection area of the combined image is compared with a character string indicating the individual information acquired in S1702.

As described above, according to the present embodiment, read images can be combined into a combined image such that the boundary at the time of combining is not located in the ID area. As a result, the accuracy of extraction of the ID can be improved.

Other Embodiments

In the example described above, a single ID area including a barcode that is a code image is printed in a sheet. However, a plurality of ID areas may be included in a printed sheet.

Figure 18A:
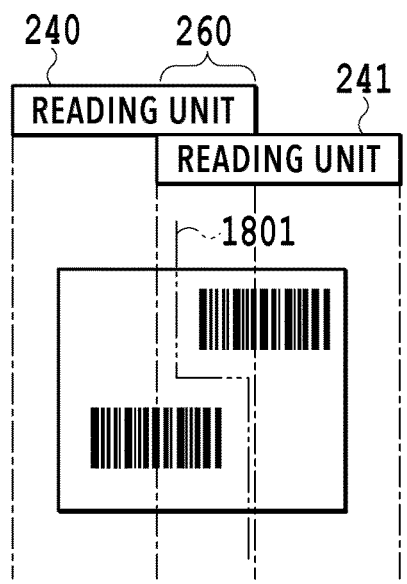
FIGS. 18A to 18C are diagrams illustrating settings of a boundary in combining processing.
Figure 18B:
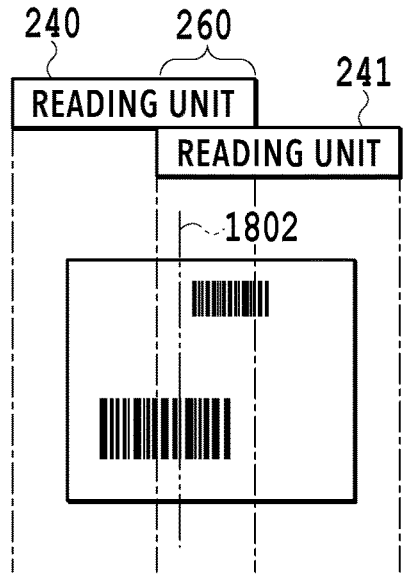
Figure 18C:
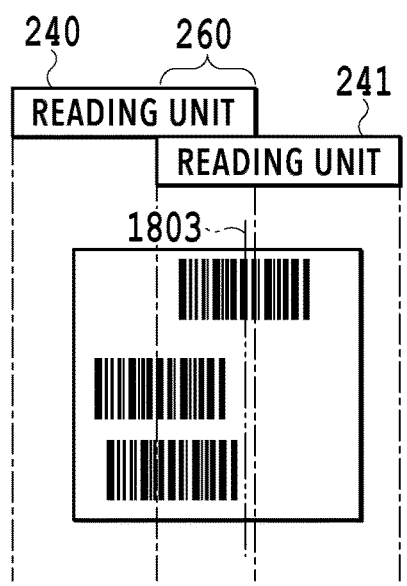

FIGS. 18A to 18C are diagrams showing examples of a printed sheet with a plurality of ID areas. As examples of a printed sheet including a plurality of ID areas, cases where a plurality of one-dimensional barcodes are present will be described.

If there are a plurality of barcodes, the boundary set in the combining processing in S1404 does not have to be a straight line as shown by the boundary 1801 in FIG. 18A. That is, it is only necessary to set the boundary inside the overlap area 260 between the reading units 240 and 241 and outside the ID areas where the barcodes are present. The boundary may have a rectangular or curved shape.

In addition, in case of necessity to set the boundary as a straight line in the y-direction (vertical direction), the boundary may be set such that the boundary 1802 is not located on a barcode which is small in size such as an area, a width in the x-coordinate direction, or a width in the y-coordinate direction, as shown in FIG. 18B. For example, as a pattern width of a barcode decreases, there is a higher possibility that a pixel shift caused by image combining inhibits appropriate reading of the barcode. Accordingly, the accuracy of reading code images such as barcodes from the combined image can be improved by setting the boundary such that the boundary is not included in a barcode (ID area) having the smallest size.

Alternatively, in a case where there are a plurality of code images, the boundary may be set such that the number of barcodes overlapping the boundary is the smallest, like the boundary 1803 in FIG. 18B. Since the number of barcodes having the possibility of a pixel shift can be reduced by reducing the number of barcodes (ID areas) overlapping the boundary, the accuracy of reading the barcodes can be improved.

According to the technique of the present disclosure, predetermined information embedded in a code image can be extracted even in a case where a sheet with the code image printed thereon is read by a plurality of read apparatus.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-078550, filed May 6, 2021, which is hereby incorporated by reference wherein in its entirety.

What is claimed is:

1. An image processing apparatus for inspection of a sheet on which a code image obtained by encoding predetermined information is printed, the image processing apparatus comprising:
   a first acquisition unit configured to acquire positional information indicating a position and a size of the code image in the sheet;
   a second acquisition unit configured to acquire a plurality of read images obtained by a plurality of reading units reading different portions of the sheet, respectively, wherein the read images become an image indicating the entire sheet by being combined;
   a determination unit configured to determine whether any one of the read images includes the entire code image based on the positional information; and
   an extraction unit configured to extract the predetermined information by reading the code image in the read image including the entire code image.

2. The image processing apparatus according to claim 1, further comprising a combining unit configured to combine the read images to generate a combined image indicating the entire sheet.

3. The image processing apparatus according to claim 2, wherein
   in a case where the determination unit determines that there is no read image including the entire code image, the combining unit generates the combined image, and
   the extraction unit extracts the predetermined information by reading the code image in the combined image.

4. The image processing apparatus according to claim 2, further comprising a setting unit configured to set a boundary to generate the combined image,
   wherein in a case where the determination unit determines that there is a read image including the entire code image, the setting unit sets the boundary such that the boundary is not included in the code image,
   the combining unit generates the combined image by combining the read images such that the read images are connected at the boundary, and
   the extraction unit extracts the predetermined information by reading the code image in the combined image.

5. The image processing apparatus according to claim 4, wherein
   in a case where a plurality of code images are included in the sheet, the setting unit sets the boundary such that the boundary is not included in one of the code images having the smallest size.

6. The image processing apparatus according to claim 4, wherein
   in a case where a plurality of code images are included in the sheet, the setting unit sets the boundary such that the number of code images including the boundary is smaller than the number of code images included in the sheet.

7. The image processing apparatus according to claim 1, further comprising:
   a registration unit configured to register a master image as an image corresponding to a sheet to be a target of the inspection and register a position and a size of the code image in the master image as the positional information; and
   a processing unit configured to perform processing to convert a position in the read image to correspond to the master image, wherein the determination unit determines whether there is a read image including the entire code image based on the converted position in the read image.

8. The image processing apparatus according to claim 7, wherein
the registration unit registers a data inspection area which is an area of the master image to be a target of the inspection, and
the image processing apparatus further comprises an inspection processing unit configured to acquire data corresponding to the data inspection area based on the predetermined information extracted by the extraction unit and executes inspection of an image printed in the data inspection area in the sheet.

9. The image processing apparatus according to claim 1, further comprising a conveyance control unit configured to control conveyance of a sheet as a target of the inspection such that a destination of the sheet is changed based on a result of the inspection.

10. The image processing apparatus according to claim 1, further comprising a display control unit configured to display a result of the inspection on a screen of a display unit.

11. The image processing apparatus according to claim 1, wherein
the code image is a barcode.

12. The image processing apparatus according to claim 1, wherein
the reading units are arranged such that there is an area in which read ranges of the respective reading units overlap each other.

13. The image processing apparatus according to claim 1, further comprising:
a printing apparatus configured to perform printing processing for a sheet; and
the reading units,
wherein a sheet for which printing processing has been performed by the printing apparatus is read by the reading units.

14. An image processing method for inspection of a sheet on which a code image obtained by encoding predetermined information is printed, the image processing method comprising:
acquiring positional information indicating a position and a size of the code image in the sheet;
acquiring a plurality of read images obtained by a plurality of reading units reading different portions of the sheet, respectively, wherein the read images become an image indicating the entire sheet by being combined;
determining whether any one of the read images includes the entire code image based on the positional information; and
extracting the predetermined information by reading the code image in the read image including the entire code image.

15. A non-transitory computer-readable storage medium storing a program which causes a computer to perform an image processing method for inspection of a sheet on which a code image obtained by encoding predetermined information is printed, the image processing method comprising:
acquiring positional information indicating a position and a size of the code image in the sheet;
acquiring a plurality of read images obtained by a plurality of reading units reading different portions of the sheet, respectively, wherein the read images become an image indicating the entire sheet by being combined;
determining whether any one of the read images includes the entire code image based on the positional information; and
extracting the predetermined information by reading the code image in the read image including the entire code image.

* * * * *